United States Patent
Lee et al.

(10) Patent No.: US 12,489,990 B2
(45) Date of Patent: Dec. 2, 2025

(54) LENSLESS IMAGING SYSTEM INCLUDING PHASE MASK

(71) Applicant: SAMSUNG ELECTRONICS CO., LTD., Suwon-si (KR)

(72) Inventors: Duhyun Lee, Suwon-si (KR); Wontaek Seo, Suwon-si (KR); Jangwoo You, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 140 days.

(21) Appl. No.: 18/222,210

(22) Filed: Jul. 14, 2023

(65) Prior Publication Data
US 2024/0205552 A1    Jun. 20, 2024

(30) Foreign Application Priority Data
Dec. 20, 2022    (KR) .................. 10-2022-0179733

(51) Int. Cl.
*H04N 23/955*    (2023.01)
*G02B 1/00*    (2006.01)
(Continued)

(52) U.S. Cl.
CPC ........... *H04N 23/955* (2023.01); *G02B 1/002* (2013.01); *G02B 5/1809* (2013.01);
(Continued)

(58) Field of Classification Search
CPC ...... H04N 23/11; H04N 23/955; H04N 23/20; H04N 23/54; H04N 23/55; H04N 21/4318; G02B 1/002; G02B 5/208; G02B 27/0087; G02B 3/0045; G02B 3/0056; G02B 6/02138; G02B 6/02142; G02B 5/30; G02B 5/3083; G02B 5/1809;
(Continued)

(56) References Cited

U.S. PATENT DOCUMENTS 9,151,891 B2 * 10/2015 Ma ................. G02B 6/1226
                                                        385/33
2017/0146806 A1 * 5/2017 Lin ................. G02B 3/0056
(Continued)

FOREIGN PATENT DOCUMENTS

CN    104156610 A    11/2014
KR    10-2020-0047612 A    5/2020

OTHER PUBLICATIONS

Tian et al., "GEOMScope: Large Field-of-View 3D Lensless Microscopy with Low Computational Complexity", Laser & Photonics Reviews, Aug. 1, 2021, 13 total pages, vol. 15, XP093139233, doi:10.1002/lpor.202100072.
(Continued)

*Primary Examiner* — Marly S Camargo
(74) *Attorney, Agent, or Firm* — Sughrue Mion, PLLC

(57) ABSTRACT

Provided is an imaging system including a phase mask including a phase modulation meta surface coded with an image reconstruction phase function configured to reconstruct an image, the image reconstruction phase function being obtained by adding a first phase function corresponding to a lens phase to a second phase function which is a random function, and an image sensor configured to convert light, transmitted through the phase mask from an object, into an electrical signal.

19 Claims, 30 Drawing Sheets

(51) Int. Cl.
  *G02B 5/18* (2006.01)
  *G02B 5/20* (2006.01)
  *G02B 27/00* (2006.01)
  *H04N 23/11* (2023.01)
  *H04N 23/20* (2023.01)
  *H04N 23/54* (2023.01)

(52) U.S. Cl.
  CPC ........... *G02B 5/1871* (2013.01); *G02B 5/208* (2013.01); *G02B 27/0087* (2013.01); *H04N 23/11* (2023.01)

(58) Field of Classification Search
  CPC ...... G02B 5/1814–1823; G02B 5/1876; G02B 5/1885; G02B 27/58; G02B 2207/101; G02B 2207/125; G02B 2207/129; H02B 5/1871; H02B 5/188
  See application file for complete search history.

(56) References Cited

U.S. PATENT DOCUMENTS

| | | |
|---|---|---|
| 2019/0064532 A1 | 2/2019 | Riley, Jr. et al. |
| 2019/0113775 A1 | 4/2019 | Jang et al. |
| 2021/0149081 A1 | 5/2021 | Groever et al. |
| 2021/0171200 A1* | 6/2021 | Moon ................. G02B 27/0172 |
| 2021/0374928 A1* | 12/2021 | Hida ....................... G06V 10/82 |
| 2021/0405270 A1* | 12/2021 | Han ....................... G02B 5/1871 |
| 2022/0086372 A1 | 3/2022 | Menon et al. |
| 2022/0196480 A1 | 6/2022 | Ang et al. |
| 2023/0111183 A1 | 4/2023 | Lee et al. |
| 2024/0272426 A1* | 8/2024 | Yang ..................... G02B 5/001 |

OTHER PUBLICATIONS

Boominathan et al., "Recent advances in lensless imaging", Optica, Jan. 20, 2022, 37 total pages, vol. 9, XP093031696, doi: 10.1364/OPTICA.431361, https://www.ncbi.nlm.nih.gov/pmc/articles/PMC9634619/pdf/nihms-1833535.pdf.

Communication dated Mar. 25, 2024, issued by European Patent Office in European Patent Application No. 23204332.3.

Cristina Palmero et al., "Multi-modal RGB-Depth-Thermal Human Body Segmentation," Int J Comput Vis (2016), No. 118, pp. 217-239, 2016, DOI 10.1007/s11263-016-0901-x.

* cited by examiner

LENSLESS IMAGING SYSTEM INCLUDING PHASE MASK

CROSS-REFERENCE TO RELATED APPLICATION

This application claims priority to Korean Patent Application No. 10-2022-0179733, filed on Dec. 20, 2022, in the Korean Intellectual Property Office, the disclosure of which is incorporated by reference herein in its entirety.

BACKGROUND

1. Field

Example embodiments of the present disclosure relate to a phase mask and a lensless imaging system using the same.

2. Description of Related Art

In general, imaging systems include an image sensor chip including a drive circuit, a packaging covering the image sensor chip, a light incident window formed in the packaging, a wavelength filter formed on the window, and an imaging lens system formed on the packaging.

Recently, lensless imaging systems have been introduced. Lensless imaging systems do not use imaging lenses used in existing imaging systems. In the case of existing imaging systems including a lens, a space for the volume of the lens, and a space required for light to travel, that is, at least a space corresponding to a focal length of the lens, are required.

In contrast, as lensless imaging systems do not need a space required by existing imaging systems using a lens, the volume of the system may be reduced and a compact imaging system may be implemented.

In lensless imaging systems, a phase mask is used instead of a lens, and the quality of an image obtained by the imaging system may change according to a phase pattern coded to the phase mask.

SUMMARY

One or more example embodiments provide a phase mask and an image system including the same.

Additional aspects will be set forth in part in the description which follows and, in part, will be apparent from the description, or may be learned by practice of the example embodiments of the disclosure.

According to an aspect of an embodiment, there is provided an imaging system including a phase mask including a phase modulation meta surface coded with an image reconstruction phase function configured to reconstruct an image, the image reconstruction phase function being obtained by adding a first phase function corresponding to a lens phase to a second phase function which is a random function, and an image sensor configured to convert light, transmitted through the phase mask from an object, into an electrical signal.

The imaging system may further include an image reconstruction processor configured to execute a reconstruction algorithm corresponding to the image reconstruction phase function and process a signal from the image sensor.

An imaging lens may not be provided between the object and the image sensor.

The second phase function may be a function having spatially correlated randomness having a coherence length as a parameter.

A point spread function by the phase modulation meta surface may include a speckle pattern formed within a certain range from a center portion of the phase modulation meta surface.

The coherence length of the second phase function may be set such that a diameter of the certain range is less than or equal to 30% of a lens effective diameter represented by the first phase function.

The second phase function may be a phase function corresponding to trainable coefficients.

The first phase function may be a phase function corresponding to a convex lens.

The first phase function may be a phase function corresponding to a micro lens array.

A distance between the phase mask and the image sensor may be less than a focal length of a lens having the first phase function.

A distance between the phase mask and the image sensor may be less than or equal to a half of a focal length of a lens having the first phase function.

The phase modulation meta surface may include a plurality of nano-structures, and a shape of the plurality of nano-structures and a size of the plurality of nano-structures may be determined based on the image reconstruction phase function.

The phase mask may further include a substrate, wherein the plurality of nano-structures are on the substrate.

The substrate may include a material transparent to long-wave infrared (LWIR).

The imaging system may further include a cover layer including a first surface facing the image sensor, and a second surface opposite to the first surface, wherein the plurality of nano-structures are on the first surface.

The imaging system may further include a filter layer on the second surface.

The filter layer may be configured to transmit long-wave infrared (LWIR) and block light of other wavelength bands.

The filter layer may be configured to transmit light of a certain wavelength band, and the cover layer may include a material transparent to the light of the certain wavelength band.

According to another aspect of an example embodiment, there is provided an electronic device including an imaging system including a phase mask including a phase modulation meta surface coded with an image reconstruction phase function configured to reconstruct an image, the image reconstruction phase function being obtained by adding a first phase function corresponding to a lens phase to a second phase function which is a random function, and an image sensor configured to convert light, transmitted through the phase mask from an object, into an electrical signal.

The phase modulation meta surface may include a plurality of nano-structures, and a shape of the plurality of nano-structures and a size of the plurality of nano-structures may be determined based on the image reconstruction phase function.

BRIEF DESCRIPTION OF THE DRAWINGS

The above and other aspects, features, and advantages of example embodiments of the disclosure will be more apparent from the following description taken in conjunction with the accompanying drawings, in which.

DETAILED DESCRIPTION

Figure 1:
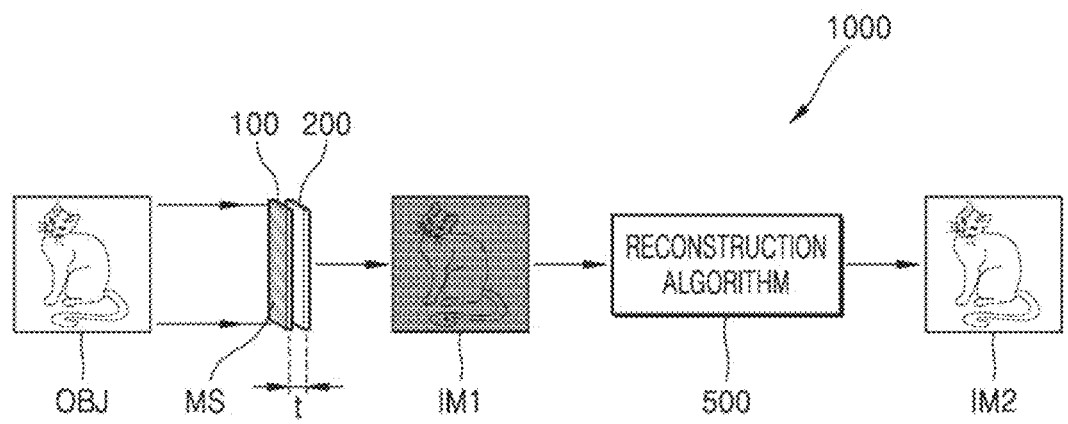
FIG. 1 is a diagram conceptually illustrating a schematic structure of a lensless imaging system including a phase mask and a method of obtaining an image, according to an example embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Example embodiments will now be described more fully with reference to the accompanying drawings. The embodiments described herein are provided merely as an example, and various modifications may be possible from the example embodiments. In the drawings, like reference numerals in the drawings denote like elements, and sizes of components in the drawings may be exaggerated for clarity and convenience of explanation.

It will be understood that when a component is referred to as being "on" another component or on "upper part" of another component, the component can be directly on the other component or over the other component in a non-contact manner.

While such terms as "first," "second," etc., may be used to describe various components, such terms are used only to distinguish one component from another. These terms are not intended to define that materials or structures of components are different.

An expression used in the singular encompasses the expression of the plural, unless it has a clearly different meaning in the context. When a portion "includes" an element, another element may be further included, rather than excluding the existence of the other element, unless otherwise described.

Moreover, the terms "part," "module," etc. refer to a unit processing at least one function or operation, and may be implemented by a hardware, a software, or a combination thereof.

The use of the terms "a" and "an" and "the" and similar referents in the context of describing embodiments (especially in the context of the following claims) are to be construed to cover both the singular and the plural.

Also, the steps of all methods described herein can be performed in any suitable order unless otherwise indicated herein or otherwise clearly contradicted by context. The use of any and all exemplary languages (e.g., "such as") provided herein, are intended merely to better illuminate the technical ideas and does not pose a limitation on the scope of rights unless otherwise claimed.

FIG. 1 is a diagram conceptually illustrating a schematic structure of a lensless imaging system including a phase mask and a method of obtaining an image according to an example embodiment.

An imaging system 1000 may include a phase mask 100 and an image sensor 200. The imaging system 1000 according to an example embodiment may not include general imaging lenses that forms an optical image of an object OBJ on an image plane of the image sensor 200, and in this aspect, the imaging system 1000 may be referred to as a lensless imaging system 1000.

The phase mask 100 may be a phase-coded mask, and may include, for example, a phase modulation meta surface coded with a phase function for image reconstruction used in reconstructing an image. The phase mask 100 may be applied to the imaging system 1000, instead of imaging lenses. By a phase function coded to the phase mask 100, that is, a phase modulation meta surface MS, light from an object OBJ may be modulated passing through the phase mask 100. When the light from the object OBJ passes through the phase mask 100 and arrives at the image sensor 200, the image sensor 200 may sense a signal of incident light and process the signal to generate a first image IM1. The generated first image IM1 may include information about the object OBJ, but may be an incomplete image that fails to fully express an actual image. The first image IM1 is provided as an example for convenience in description, and the object OBJ may not be expressed as illustrated in the first image IM1. The first image IM1 may be reconstructed as a second image IM2 by a reconstruction algorithm executed in an image reconstruction processor 500. The reconstruction algorithm may include various algorithms that may be used for image reconstruction, such as U-net, generative adversarial networks, or a variation thereof. The reconstruction algorithm may be trained to minimize a loss function value obtained comparing the second image IM2 reconstructed from the first image IM1 and the ground truth of the object OBJ, which leads to increased accuracy of the second image IM2.

When the phase mask 100 is provided, existing imaging lens may not be needed, and a distance t between the phase mask 100 and the image sensor 200 may be minimized. Accordingly, the volume of the imaging system 1000 may be minimized.

Figure 2:
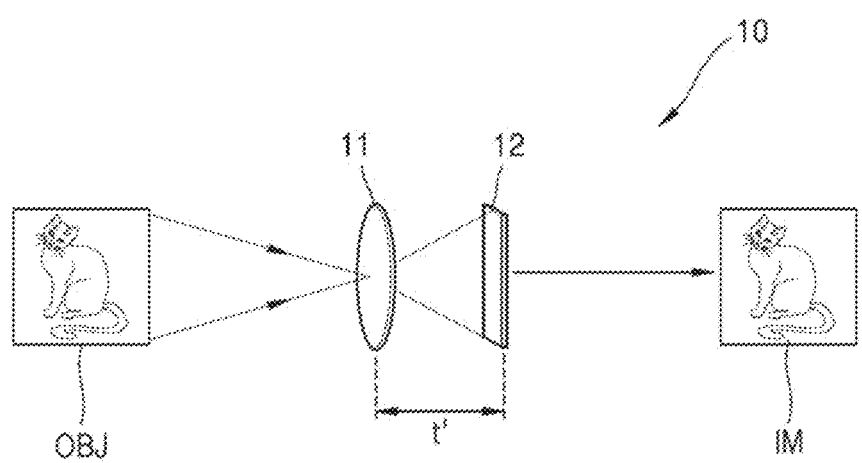
FIG. 2 is a diagram of a schematic structure of an imaging system according to a comparative example.

FIG. 2 is a diagram of a schematic structure of an imaging system according to a related example.

With reference to FIG. 2, an imaging system 10 may be a general imaging system including an imaging lens 11 and an image sensor 12. The imaging lens 11 may from an optical image of the object OBJ on an image plane of the image sensor 12. The image sensor 12 may sense and process an optical signal to generate an image IM of the object OBJ.

In the imaging system 10, the image sensor 12 may be arranged such that the image plane of the image sensor 12 is at a focal length of the imaging lens 11. That is, a distance t' between the imaging lens 11 and the image sensor 12 may be a focal length of the imaging lens 11. The distance t' may be greater than the distance t between the phase mask 100 and the image sensor 200 in the imaging system 1000 of FIG. 1. Moreover, at least one imaging lens 11, or a plurality of imaging lenses 11 may be provided, and the volume thereof may be greater than the volume of the phase mask 100.

Thus, the imaging system 1000 according to an example embodiment may have a more compact structure, compared to the imaging system 10 including a general imaging lens 11.

Referring back to FIG. 1, the image reconstruction performance of the imaging system 1000 according to an example embodiment may rely on a phase function for image reconstruction coded to the phase mask 100 and a reconstruction algorithm related thereto. The phase function for image reconstruction coded to the phase mask 100 according to an example embodiment may be obtained by adding a second phase function, which is a random function, to a first phase function corresponding to a lens phase. The lens phase may be, for example, a phase corresponding to a convex lens. The distance t between the phase mask 100 and the image sensor 200 may be less than a focal length represented by the first phase function corresponding to the lens phase. When the focal length is f, t may be, for example, less than or equal to f/2 or f/3.

The phase mask 100 to which the phase function for image reconstruction is coded may improve the image reconstruction performance, compared to the case where only a random phase function is coded.

The phase function for image reconstruction coded to the phase mask 100 is further described with reference to FIGS. 3 and 4A to 4C.

Figure 3:
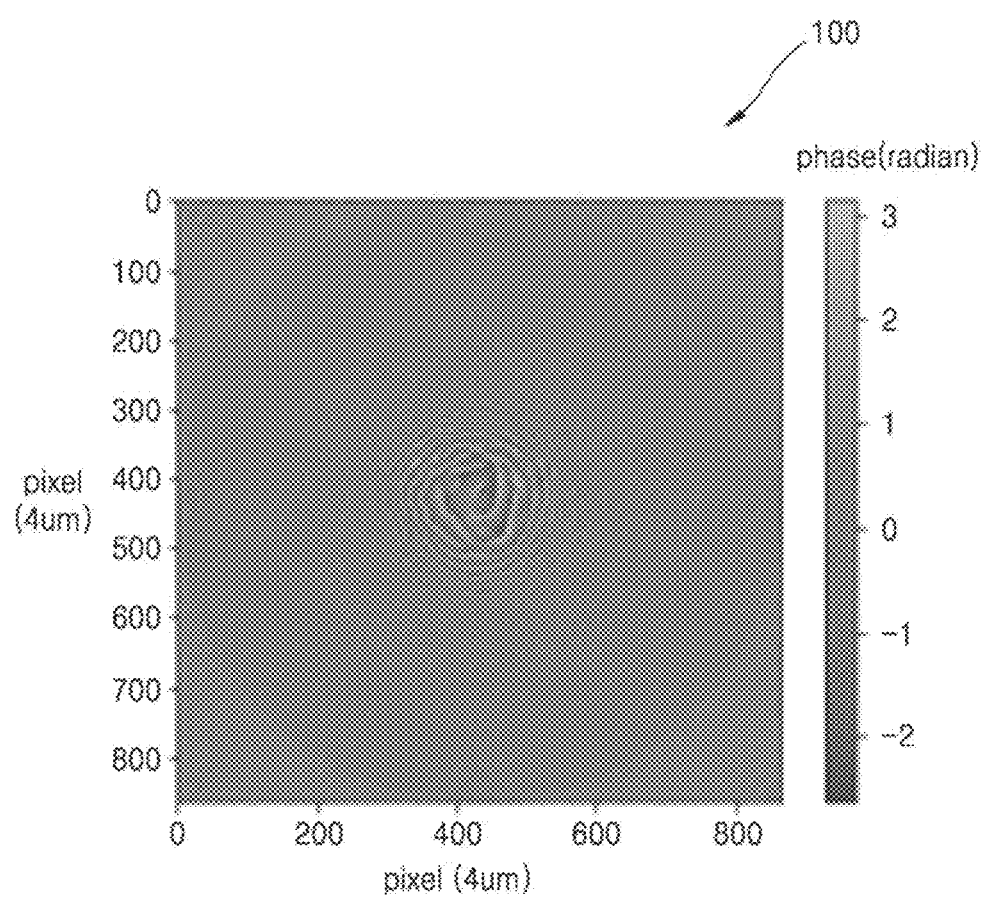
FIG. 3 is a distribution map in which a phase function for image reconstruction coded to a phase mask according to an example embodiment is mapped at a position in the phase mask.
Figure 4A:
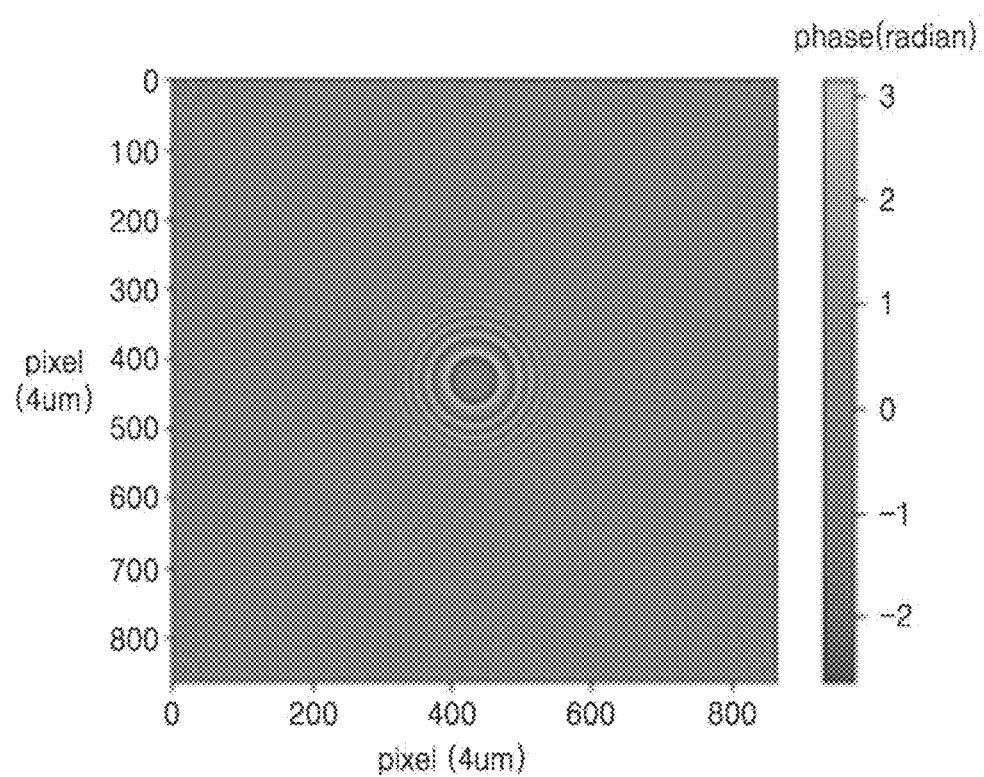
FIGS. 4A, 4B, and 4C are distribution maps in which a first phase function, a second phase function, and a circular aperture intensity used for calculation of the phase function for image reconstruction of FIG. 3 are respectively mapped at positions in a phase mask.
Figure 4B:
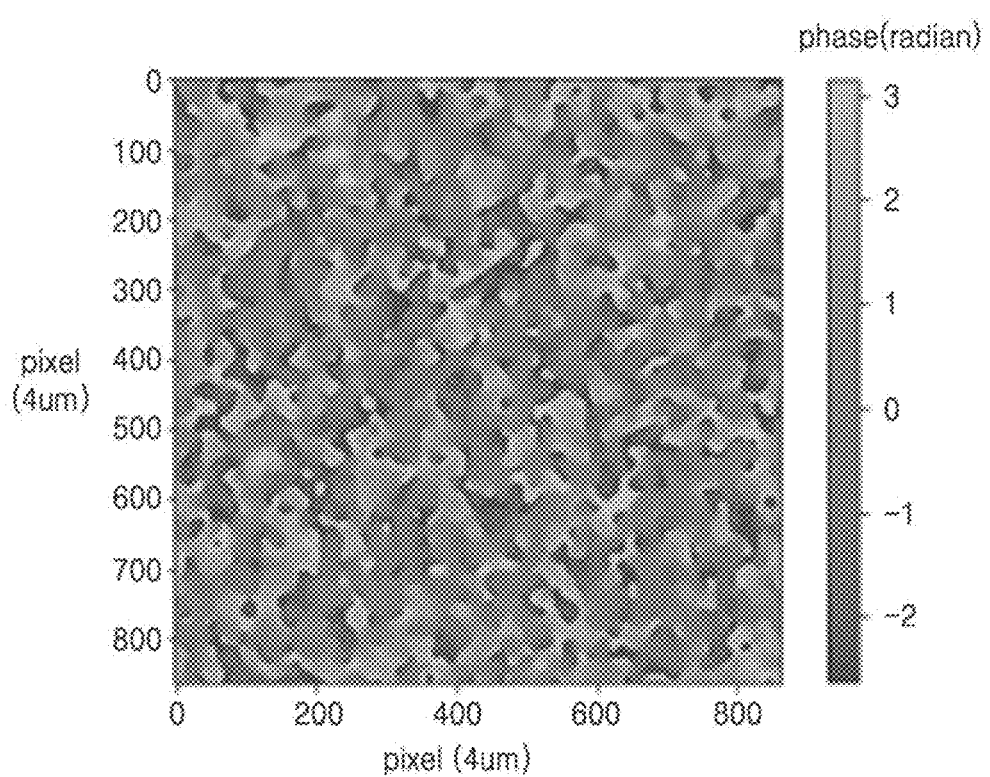
Figure 4C:
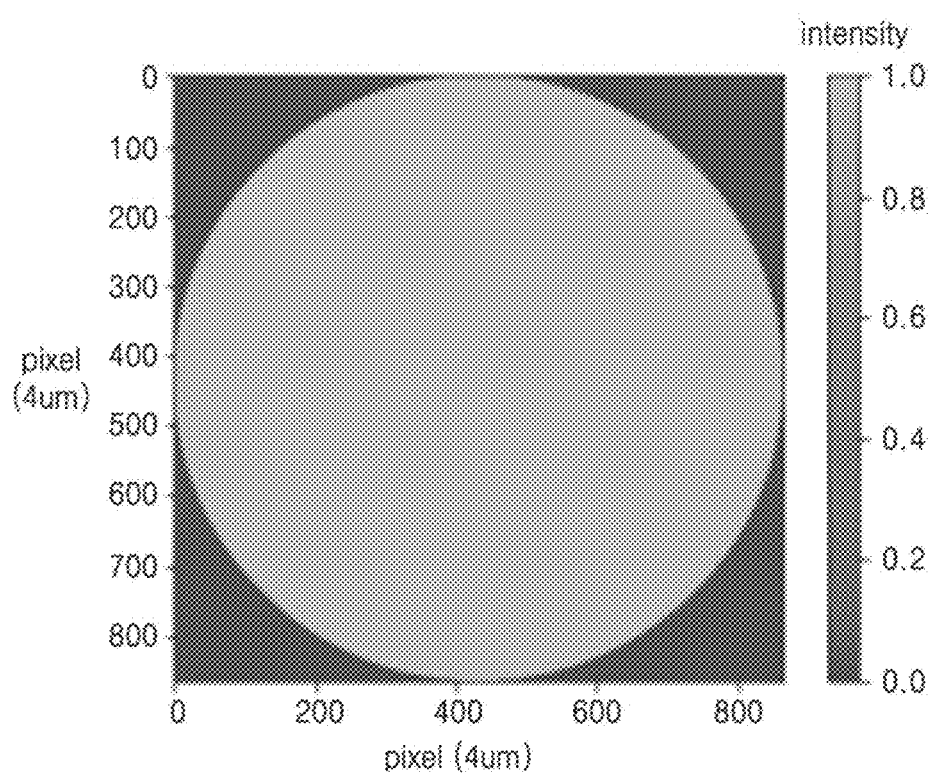

FIG. 3 is a distribution map in which a phase function for image reconstruction coded to a phase mask is mapped at a position in the phase mask according to an example embodiment, and FIGS. 4A, 4B, and 4C are distribution maps in which a first phase function, a second phase function, and a circular aperture intensity used for calculation of the phase function for image reconstruction of FIG. 3 are respectively mapped at positions in a phase mask.

To calculate the phase function for image reconstruction as shown in FIG. 3, a first phase function as shown in FIG. 4A may be set first. The first phase function represents a phase corresponding to a convex lens, and such lens phase may be represented by the following Equation 1:

$$\varphi_L(x, y) = \frac{k}{2f}(x^2 + y^2) \quad \text{[Equation 1]}$$

Here, k represents a wave number, f represents a focal length, and central coordinates of a lens are set as the origin.

Then, a second phase function to be added to the first phase function of FIG. 4A may be set. The second phase function shown in FIG. 4B is a random function, and as an example of forming randomness, spatially correlated randomness may be considered.

A transmission function t of a mask having a phase function $\varphi_r(x,y)$ may be represented by the following Equation 2:

$$t(x, y) = \exp[j\varphi_r(x, y)] \quad \text{[Equation 2]}$$

The spatially correlated randomness of the phase function may be obtained by convolution of a phase function r(x,y) in the form of a delta function and a Gaussian function f(x,y) represented by the following Equation 3:

$$\varphi_r(x, y) = r(x, y) \otimes f(x, y) \quad \text{[Equation 3]}$$

When the variance of r(x,y) is $\sigma_r^2$, and the Gaussian function f(x,y) is represented as below using the width parameter $\sigma_f$ represented by the following Equation 4:

$$f(x, y) = \frac{1}{\pi \sigma_f^2} \exp\left[-\frac{x^2 + y^2}{\sigma_f^2}\right] \quad \text{[Equation 4]}$$

The coherence length of the mask may be represented by the following Equation 5:

$$L_{cv}^2 = \frac{4\pi \sigma_f^4}{\sigma_r^2} \quad \text{[Equation 5]}$$

The coherence length and the randomness of the mask may be inversely proportional.

FIG. 4C shows the circular aperture intensity. Such an intensity function may be used in setting an effective diameter at a phase mask. When the aperture intensity function shown in FIG. 4C is CA, the phase function for image reconstruction shown in FIG. 3, $\varphi_h$, may be represented by the following Equation 6:

$$\varphi_h = \varphi_r + \varphi_L) \cdot CA \qquad \text{[Equation 6]}$$

According to another example embodiment, the phase function for image reconstruction may be set without applying the aperture intensity thereto as represented by the following Equation 7:

$$\varphi_h = \varphi_r + \varphi_L \qquad \text{[Equation 7]}$$

Such calculated phase function for image reconstruction shown in FIG. 3 may be distinguished from a random phase function, i.e., a lens phase function and referred to as a hybrid phase function.

A phase mask to which such hybrid phase function is applied may show a sharp phase change in a central portion, compared to a peripheral portion. The phase change cycle may become longer from the central portion to the peripheral portion. In general, it may be observed that a phase change is sharper in an area within ½ of a radius of the phase mask than in an area outside of ½ of a radius of the phase mask. In comparison with a lens phase in which an area representing a same phase is shown as a concentric circle, the area within ½ of the radius of the phase mask may show a same-phase area having a shape of distorted concentric circle.

The meta surface coded with the phase function for image reconstruction may be implemented by using the nano-structures. A plurality of nano-structures having a shape and a size which are capable of representing set phase modulation may be arranged at each position of the phase mask according to the phase function for image reconstruction.

Figure 5A:
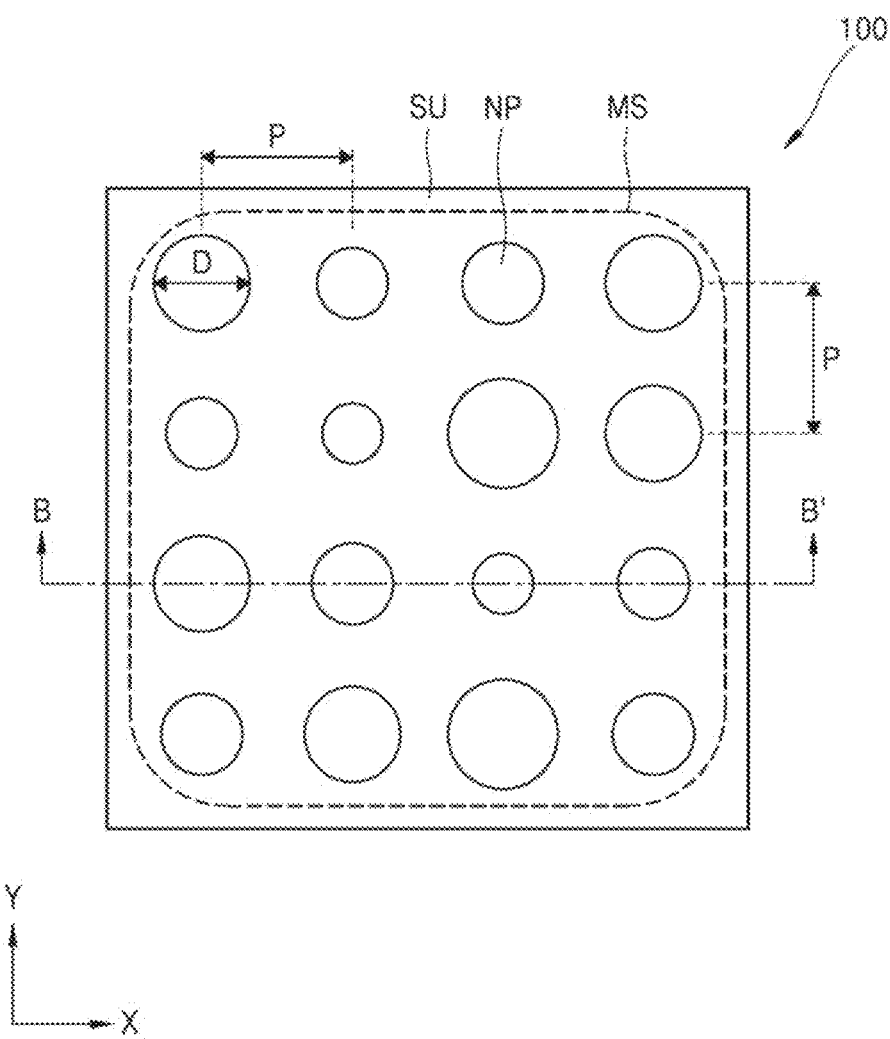
FIGS. 5A and 5B are respectively a plan view and a cross-sectional view schematically illustrating a structure of a phase mask according to an embodiment.
Figure 5B:
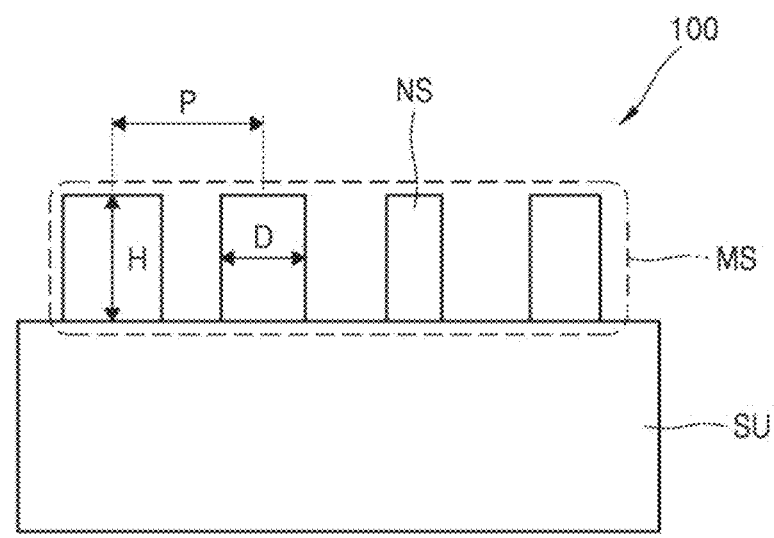

FIGS. 5A and 5B are respectively a plan view and a cross-sectional view schematically illustrating a structure of a phase mask according to an example embodiment.

The phase mask 100 may include a substrate SU and a plurality of nano-structures NS formed on the substrate SU. The plurality of nano-structures NS may be included in the phase modulation meta surface MS. The number of nano-structures NS provided in the drawings is for convenience in description, and a greater number of nano-structures NS may be provided. Although the nano-structures NS are described as a cylindrical shape having a diameter of D and a height of H, the shape of the nano-structures NS is not limited thereto, and the shape of some or all of the nano-structures NS may be changed to an elliptic cylindroid, a polyprism, or any other post shapes having various symmetrical or asymmetrical cross-sections. The nano-structures NS may be in the form of a hole. For example, the nano-structures NS may be formed by forming a material layer and engraving a nano-post shape on the material layer.

The nano-structures NS may have shape dimensions of a sub-wavelength. That is, shape dimensions may be less than a center wavelength of a wavelength band of light to be modulated may be applied to a diameter D or a height H of the nano-structures NS. An array pitch P among the nano-structures NS may also be a sub-wavelength. The diameter D of the nano-structure NS may be a sub-wavelength, and the height H may have a range greater than or equal to the sub-wavelength. The wavelength band may be an infrared wavelength band or a long-wave infrared (LWIR) band in a range of about 8 µm to about 14 µm. However, embodiments are not limited thereto.

The nano-structure NS may include c-Si, p-Si, a-Si, a III-V compound semiconductor (gallium phosphide (GaP), gallium nitride (GaN), gallium arsenide (GaAs), etc.), silicon carbide (SiC), titanium oxide (TiO2), silicon nitride (SiN), titanium nitride (TiN), and/or a combination thereof. A material of the nano-structure NS may be determined in detail considering a wavelength band to be modulated. For example, amorphous silicon (a-Si), which is suitable for the LWIR band, may be used. According to another example embodiment, silicon nitride (SiN) or titanium nitride (TiN), which is suitable for the visible light band, may be used. The nano-structures NS may perform amplitude modulation as well as the phase modulation, and such nano-structure NS may be formed of a metal material. For example, some of the nano-structures NS may include a material suitable for phase modulation and others may include a material suitable for amplitude modulation.

The nano-structures NS are described as a square arrangement of regular array pitch P, however, embodiments are not limited thereto. The nano-structures NS may be arranged in in different types of lattice arrangement, the array pitch P may not be constant, and the heights H may be different from each other. The nano-structures NS may be, for example, an array of cylinders having constant height of 6 µm, constant pitch of 4 µm, and diameters of a sub-wavelength which are varied at each position. The diameter D of the nano-structure NS may be less than or equal to about 4 µm or about 0.3 µm to about 2 µm.

The substrate SU may be formed of a material transparent to light of a wavelength band to be modulated. For example, the substrate SU may be formed of a material transparent to LWIR, and may be, for example, a silicon substrate.

The material, shape, size, and shape distribution of each of the plurality of nano-structures NS forming the phase modulation meta surface MS may be determined to be suitable for the phase function for image reconstruction. The phase function for image reconstruction may be information used in the reconstruction algorithm to reconstruct a digital image generated at the image sensor 200 to an image of an object.

The light efficiency of the phase mask according to an example embodiment is described with reference to FIGS. 6A and 9.

Figure 6A:
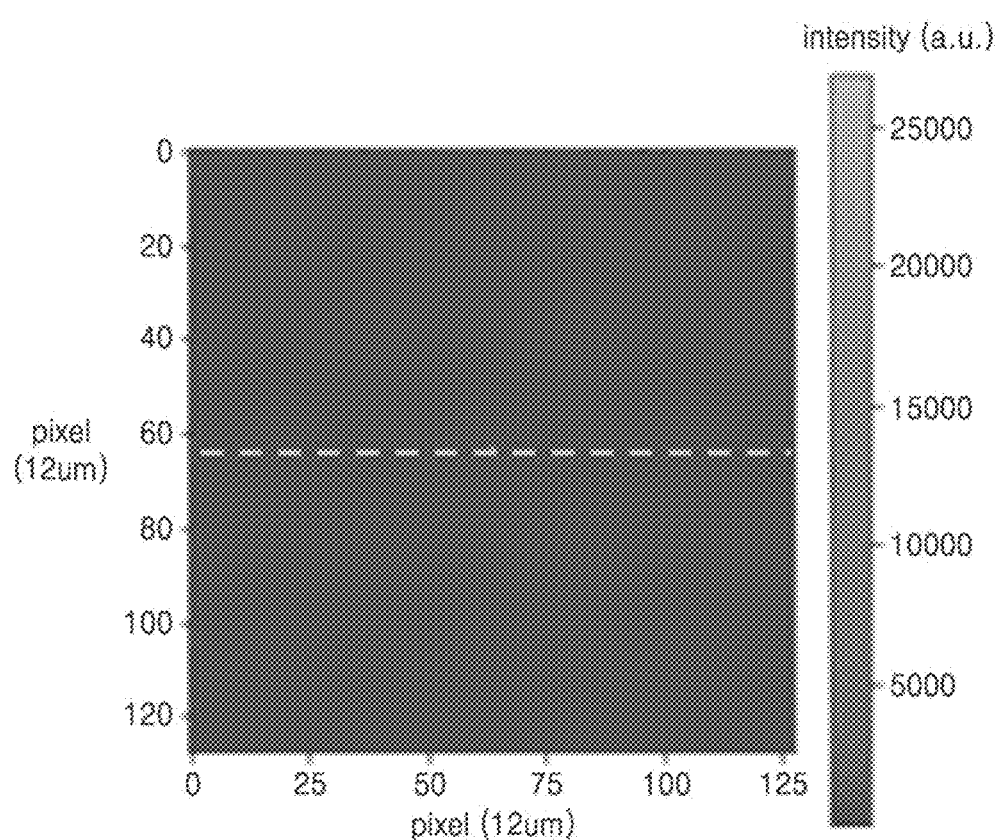
FIGS. 6A and 6B are respectively a distribution map and a graph showing a point spread function (PSF) by a first phase function.
Figure 6B:
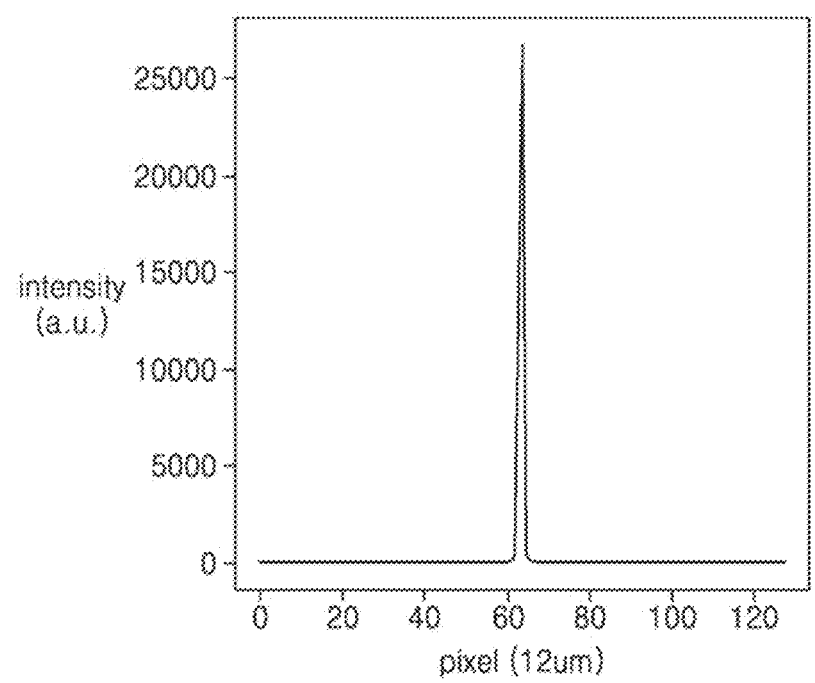

FIGS. 6A and 6B are respectively a distribution map and a graph showing a point spread function (PSF) by a first phase function.

The PSF shows imaging results of a point object by an imaging system. FIG. 6A shows an imaging result of a point object by an imaging system to which a phase mask coded with the first phase function is applied. As described above with reference to FIG. 4A, the first phase function is a lens phase, and accordingly, the PSF by such phase lens shows an imaging result of a point object, which appears as a point almost without blurring. FIG. 6B is a graph showing the intensity along with the dotted line, and illustrates that the light is concentrated at one point.

Figure 7A:
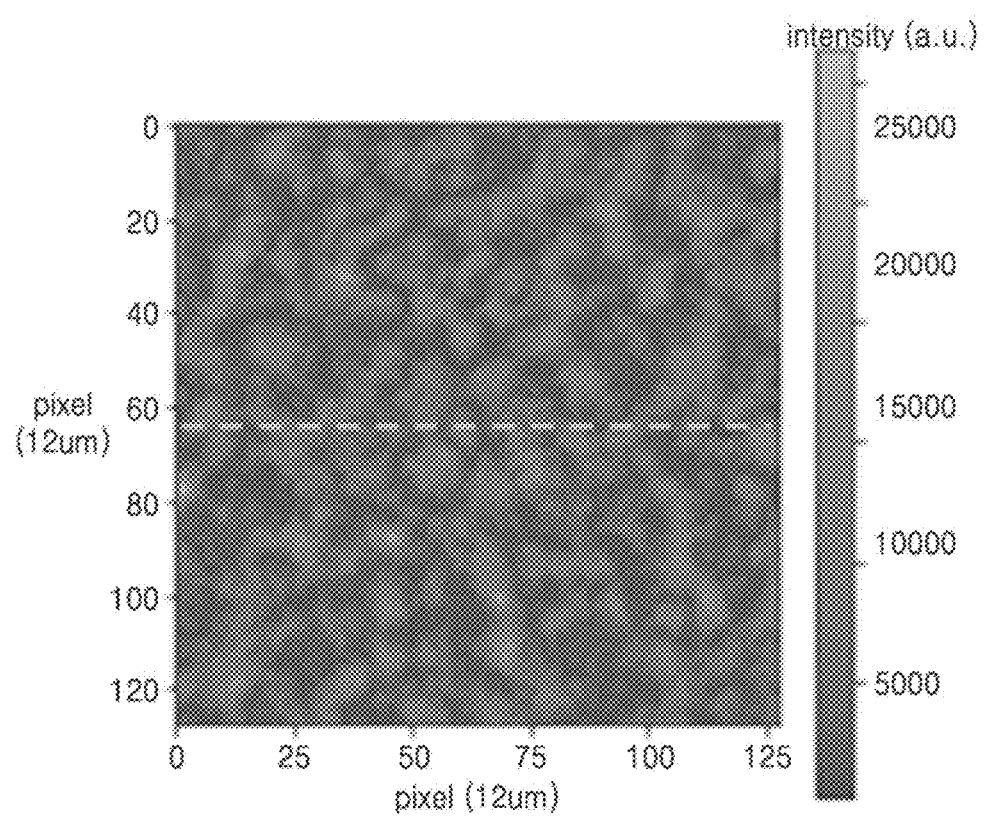
FIGS. 7A and 7B are respectively a distribution map and a graph showing a PSF by a second phase function.
Figure 7B:
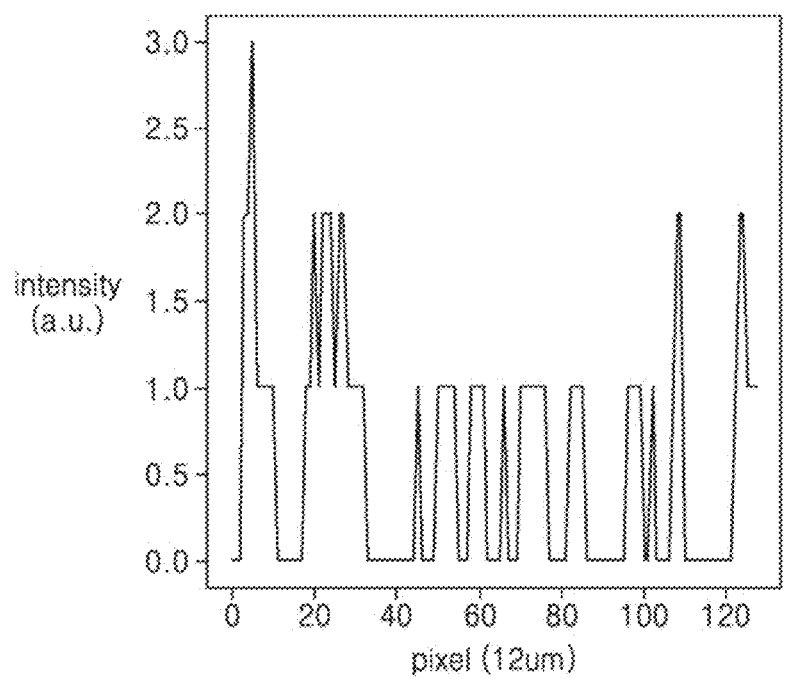

FIGS. 7A and 7B are respectively a distribution map and a graph showing a PSF by a second phase function.

FIG. 7A shows an imaging result of a point object by an imaging system to which a phase mask coded with the second phase function is applied. As described above with reference to FIG. 4B, the second phase function may be a random phase. The PSF by such a random phase may show an imaging result of a point object, which appears as random distribution of multiple points with heavy blurring. FIG. 7B is a graph showing the intensity along with the dotted line of FIG. 7A, and with reference to the graph, multiple peaks appear at an irregular distance over the entire range in the x axis direction.

Such result suggests that the phase mask of the related example to which only a random phase is applied may have relatively low light efficiency due to light scattering in all directions. Moreover, an image obtained by an imaging system using such phase mask may be heavily distorted and have lower quality.

Figure 8A:
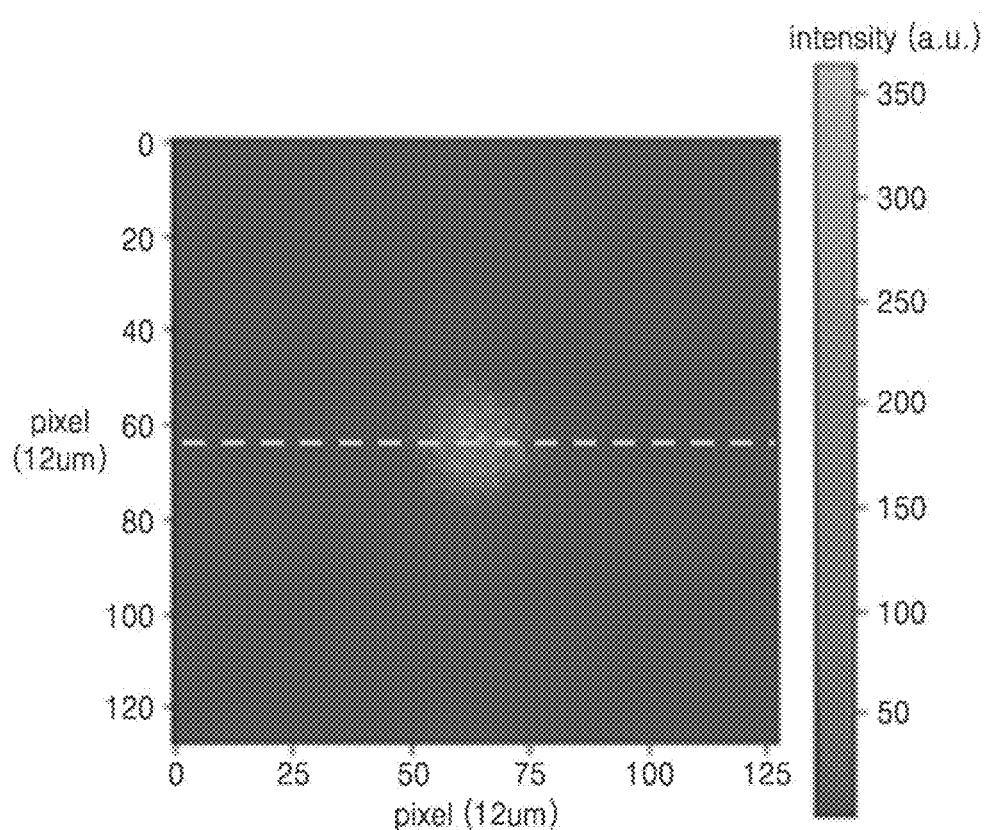
FIGS. 8A and 8B are respectively a distribution map and a graph showing a PSF by a phase mask according to an example embodiment.
Figure 8B:
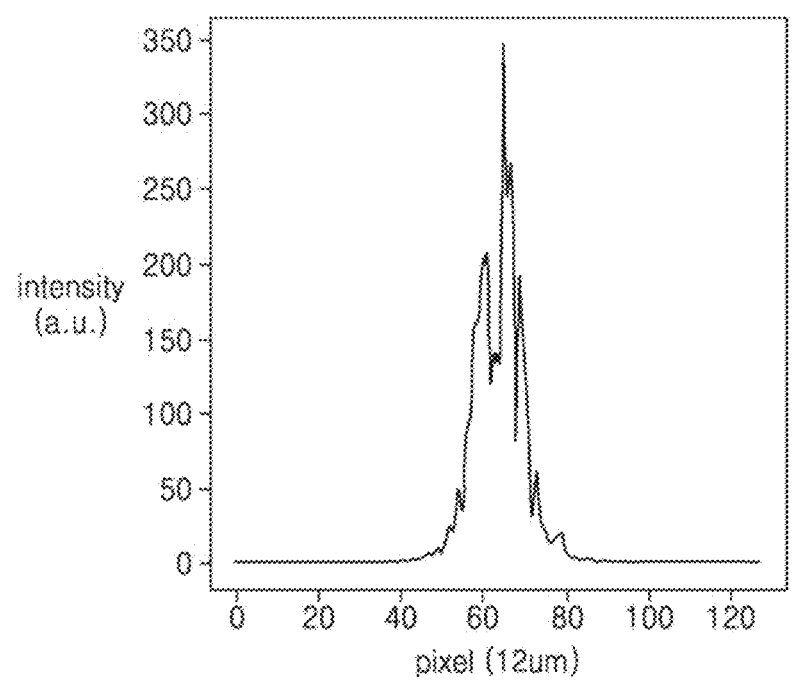

FIGS. 8A and 8B are respectively a distribution map and a graph showing a PSF by a phase mask according to an example embodiment.

The phase function for image reconstruction obtained by adding the first phase function to the second phase function may be coded to the phase mask according to an example embodiment. For example, phase functions representing the PSF shown in FIGS. 7A and 7B are added up and coded to the phase mask according to an example embodiment.

FIG. 8A shows an imaging result of a point object by an imaging system to which a phase mask according to an example embodiment is applied. With reference to FIG. 8A, a point object is imaged as multiple points with blurring concentrated at the center. This may be seen as a speckle pattern formed in a limited area, i.e., a center portion.

FIG. 8B is a graph showing the intensity along with the dotted line of FIG. 8A. This graph is different from the graph of FIG. 7B of a random phase and more similar to the graph of FIG. 6B of a lens phase. The central portion of the graph includes a plurality of discontinuous peaks, and apart from the discontinuity, the graph of FIG. 6B has a lower peak value and a wider full width at half maximum. When comparing FIG. 8B with FIG. 7B by a random phase, an area in which scattered light is distributed is limited to a certain range at the central portion. As such, although the phase mask according to an example embodiment scatters light in various directions, the phase mask may have a certain scattering range such that the scattered light can be used, and thus the light efficiency of the phase mask may be similar to that of a lens.

Figure 9:
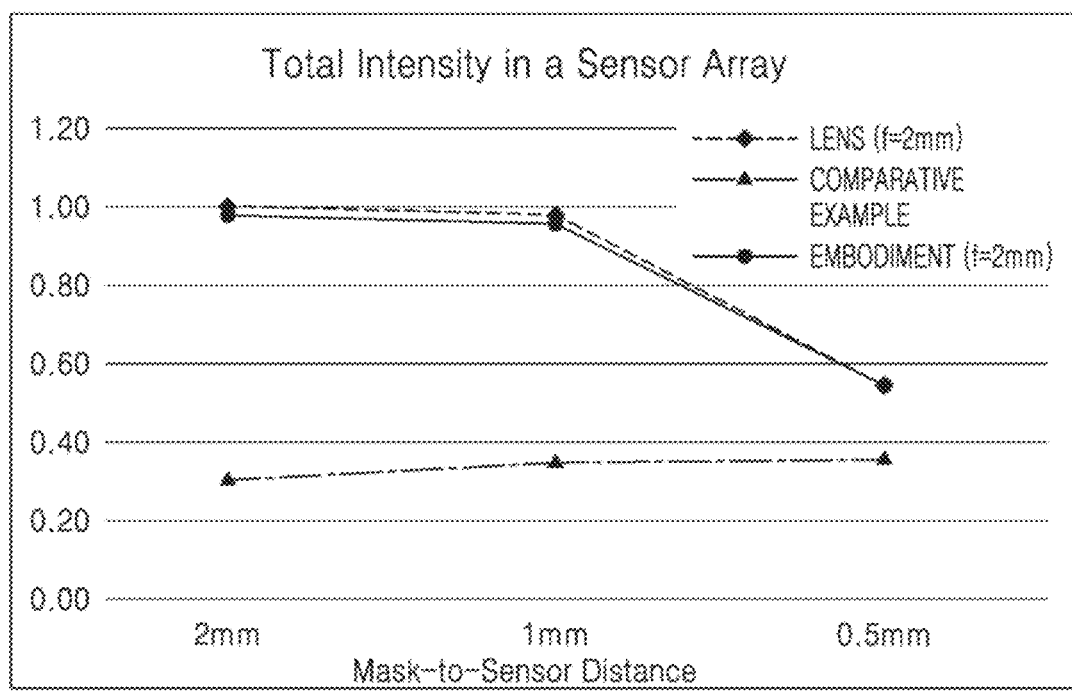
FIG. 9 illustrates a graph showing a comparison of light efficiencies in obtaining an image using a phase mask according to an example embodiment and a phase mask according to a related example.

FIG. 9 illustrates graphs showing comparison of light efficiencies in obtaining an image using a phase mask according to an example embodiment and a phase mask according to a related example.

In the graph, the related example represents an imaging system using a phase mask coded only with the second phase function, i.e., a random phase, and the example embodiment represents an imaging system using a phase mask coded with a phase function obtained by adding a random phase to a lens phase having a focal length of 2 mm. With respect to the total intensity of light at the image sensor, the example embodiment shows a significantly higher intensity than the related example, which is similar to the result obtained from a lens imaging system.

As such, the light efficiency of the phase mask according to an example embodiment may be similar to that of a lens.

Figure 10A:
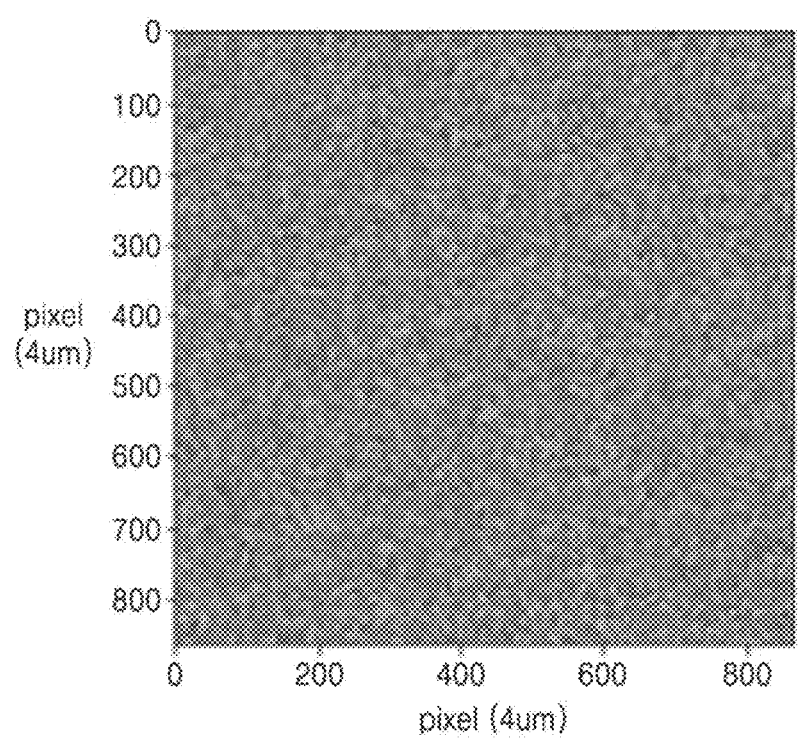
FIGS. 10A, 10B, and 10C show a random phase function used for phase coding of a phase mask according to an example embodiment and respectively illustrate the cases in which coherence lengths are 5 µm, 10 µm, and 20 µm.
Figure 10B:
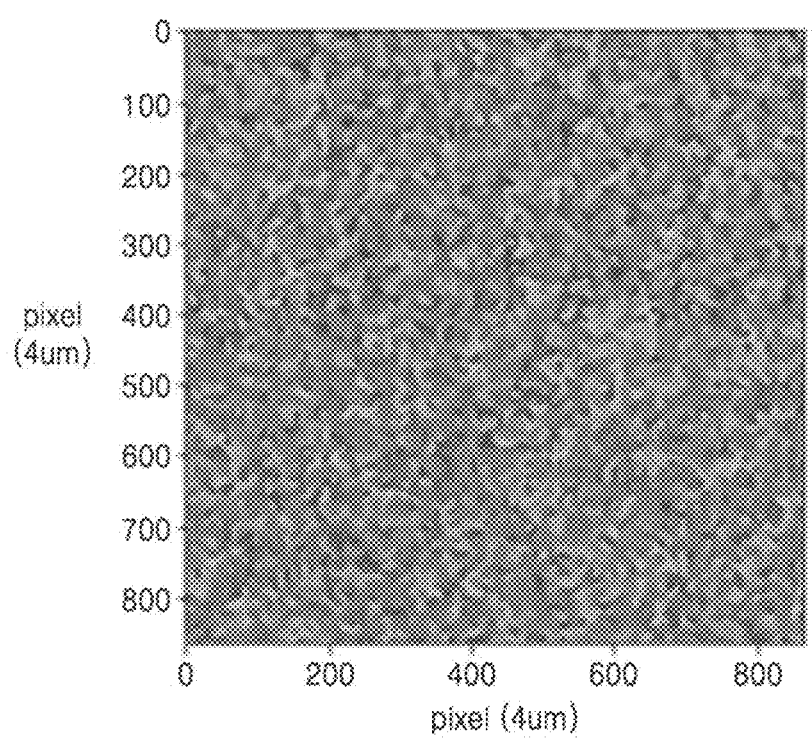
Figure 10C:
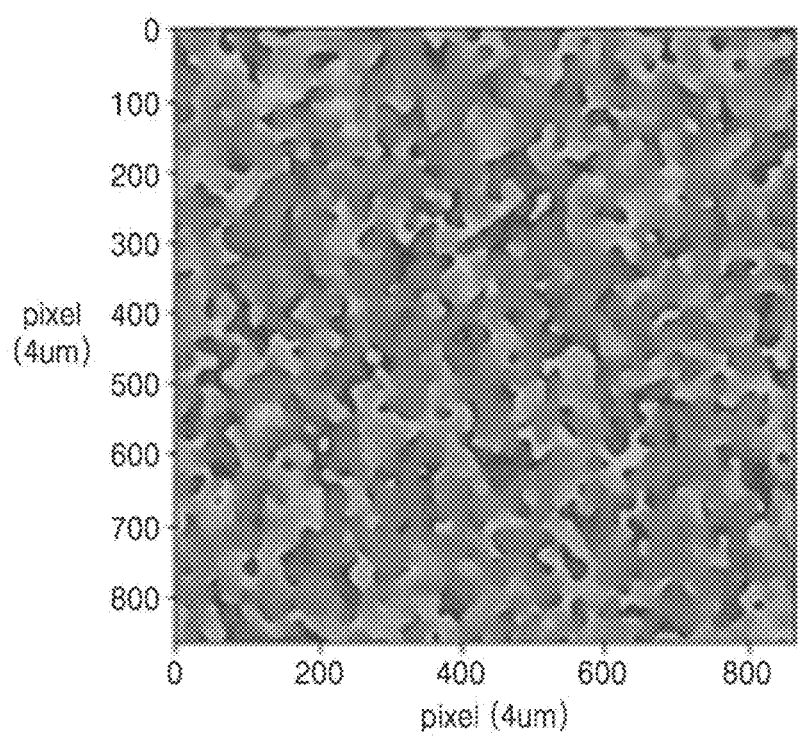

FIGS. 10A to 10C show a random phase function used for phase coding of a phase mask according to an example embodiment and respectively illustrate the cases where a coherence length is 5 μm, 10 μm, and 20 μm.

As described above with reference to FIG. 4A, the coherence length may be a major parameter to define a random function. The coherence length relates to a length at which a phase is well defined, for example, a length defined as a sine wave, and accordingly, the shorter the coherence length is, the greater the randomness may be.

Figure 11A:
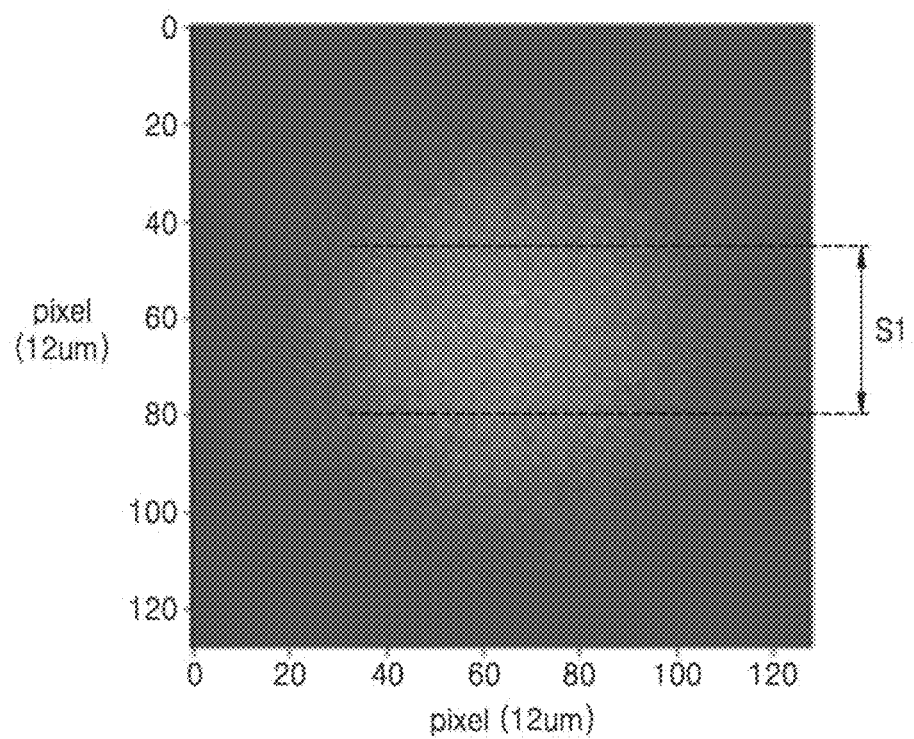
FIGS. 11A, 11B, and 11C are distribution maps showing a point spread function (PSF) by a phase mask according to an example embodiment and respectively illustrate the cases in which coherence lengths of a random phase used for phase coding are 5 µm, 10 µm, and 20 µm.
Figure 11B:
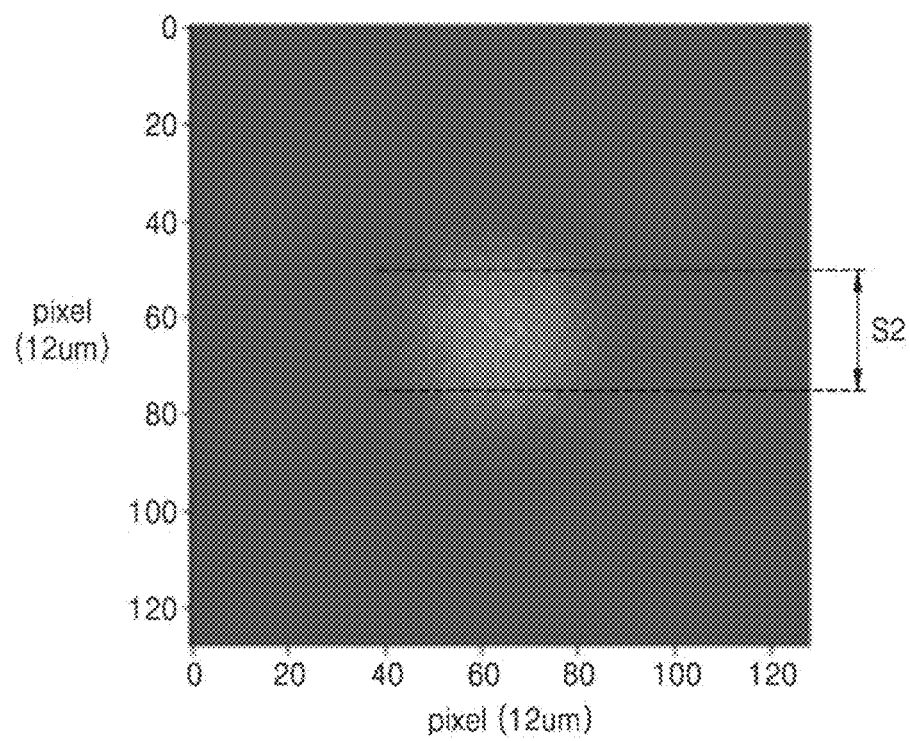
Figure 11C:
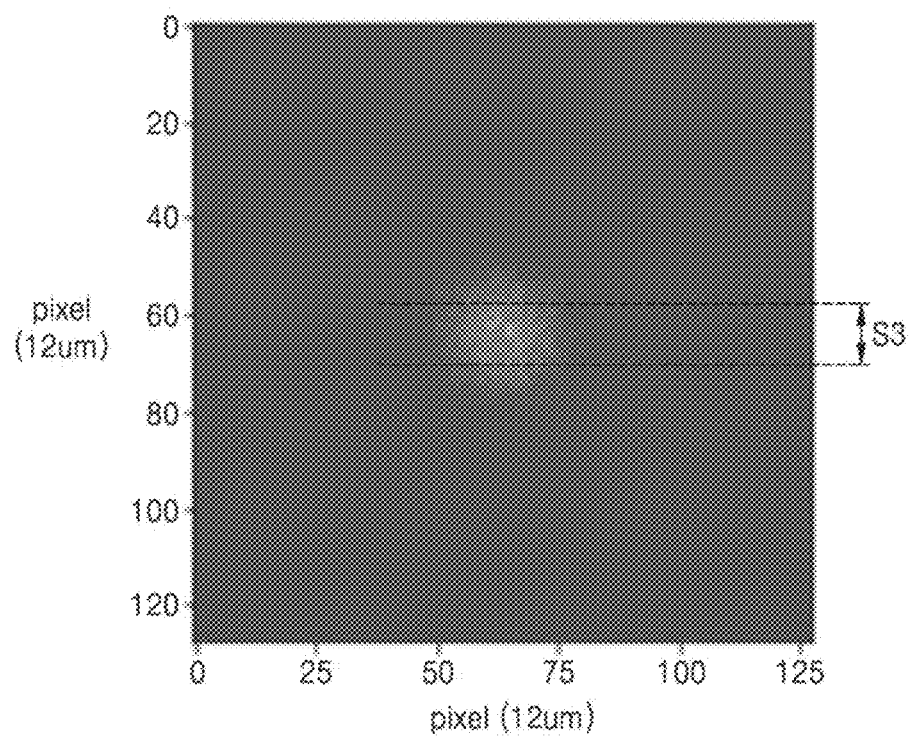

FIGS. 11A to 11C are light distribution maps showing a point spread function (PSF) by a phase mask according to an example embodiment and respectively illustrate the cases where a coherence length of a random phase used for phase coding is 5 μm, 10 μm, and 20 μm.

FIG. 11A shows the PSF by the phase mask coded with the phase function obtained by adding the lens phase to the random phase of FIG. 10A. The distribution range of the speckle pattern formed at the center may approximately be a diameter range of S1 from the center. The length of S1 may vary according to a method of defining an area considered as a speckle pattern, but may be within a range of about 30 pixels to about 50 pixels. As one pixel is 12 μm, S1 may be in a range of about 360 μm to about 600 μm. Such range may be within 10% to 18% of a lens effective diameter shown in a lens phase used for computation of a phase function for image reconstruction.

FIG. 11B shows the PSF by the phase mask coded with the phase function obtained by adding the lens phase to the random phase of FIG. 10B. The distribution range of the speckle pattern formed at the center may approximately be a diameter range of S2 from the center. The length of S2 may be in a range of about 20 pixels to about 35 pixels, i.e., 240 μm to about 420 μm. Such range may be within 7% to 13% of a lens effective diameter shown in a lens phase used for computation of a phase function for image reconstruction.

FIG. 11C shows the PSF by the phase mask coded with the phase function obtained by adding the lens phase to the random phase of FIG. 10C. The distribution range of the speckle pattern formed at the center may approximately be a diameter range of S3 from the center. The length of S3 may be in a range of about 15 pixels to about 25 pixels, i.e., 180 μm to about 300 μm. Such range may be within 5% to 9% of a lens effective diameter shown in a lens phase used for computation of a phase function for image reconstruction.

Hereinafter, images obtained by the lensless imaging system of various example embodiments and an imaging system of a related example are compared and reviewed referring to FIGS. 12A to 14.

Figure 12A:
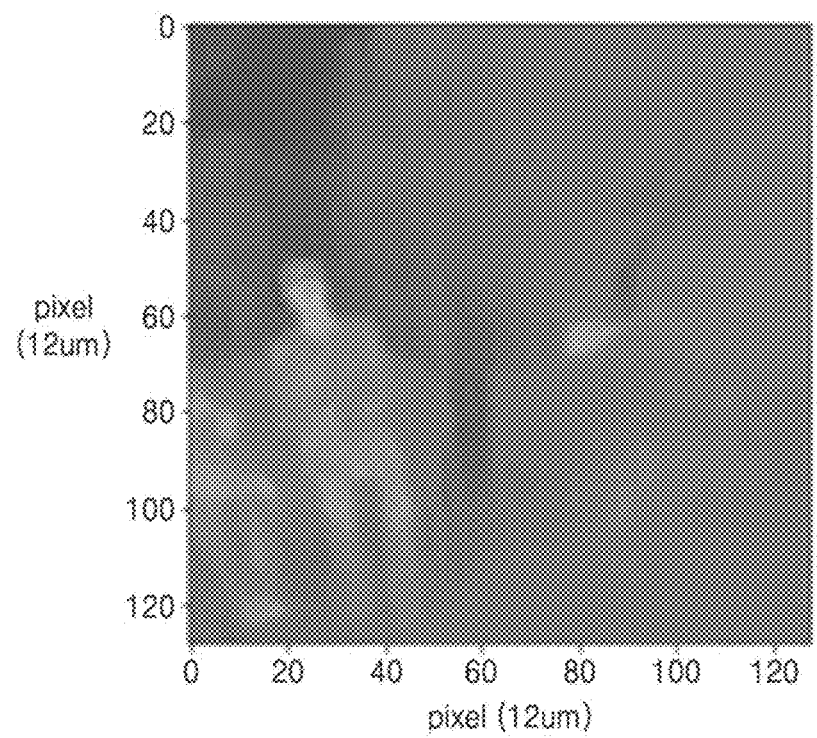
FIGS. 12A, 12B, and 13 show example images obtained by a lensless imaging system according to an example embodiment, in which coherence lengths of a random phase function used for phase coding of a phase mask provided in each system are 5 µm and 20 µm.
Figure 12B:
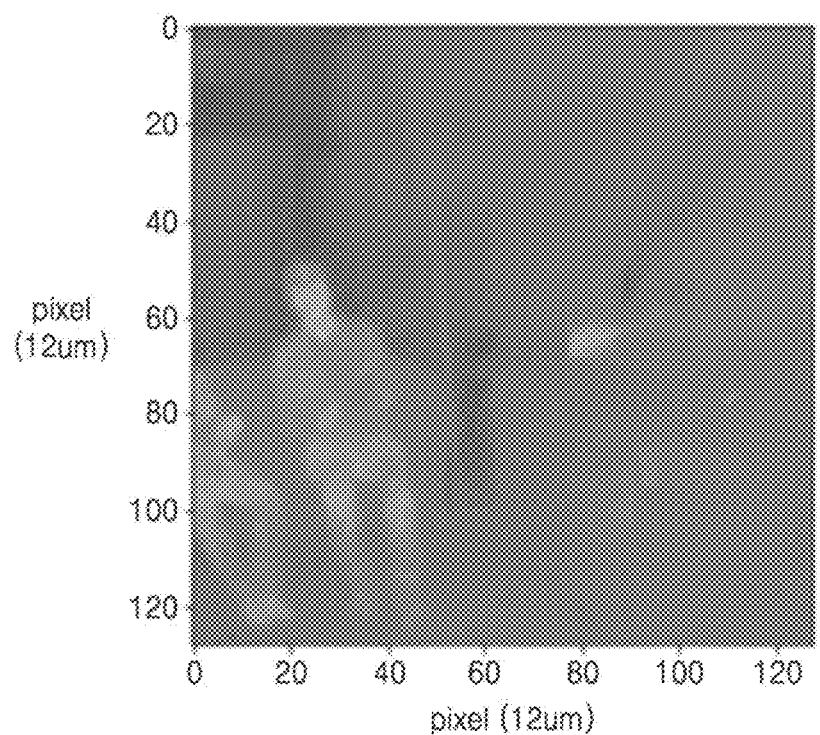

FIGS. 12A and 12B show an example images obtained by a lensless imaging system according to an example embodiment where a coherence length of a random phase function used for phase coding of a phase mask provided in each system is 5 μm and 20 μm.

For example, FIG. 12A shows an image obtained by an imaging system to which the phase mask showing the PSF of FIG. 11A is applied, and FIG. 12B shows an image obtained by an imaging system to which the phase mask showing the PSF of FIG. 11C is applied.

Figure 13:
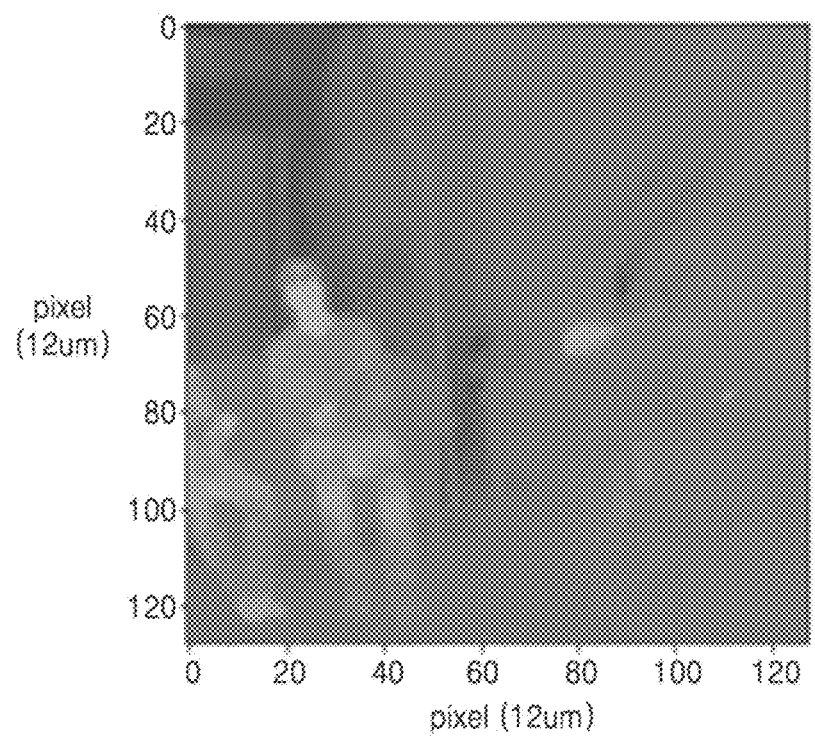

FIG. 13 shows the ground truth, i.e., an actual image of the object of FIGS. 12A and 12B obtained by using an infrared camera. When comparing FIGS. 12A and 12B, FIG. 12B illustrating the case where the coherence length used in a random phase is 20 μm is closer to FIG. 13 which shows the ground truth. However, both FIGS. 12A and 12B show an image having relatively good quality that is close to the ground truth of FIG. 13.

The foregoing results show that the images obtained when the coherence length of the random function used in calculating the phase function for image reconstruction coded to the phase mask is about 5 μm to about 20 μm generally have good quality. In the perspective of PSF by the phase mask, when the diameter in a certain range occupied by the speckle pattern at the center shown in the PSF is about 30% or less of the lens effective diameter indicated by the lens phase, an image may be expected to have relatively good quality. The less the diameter in a certain range occupied by the speckle pattern shown in the PSF is, the general quality of the image may be higher. For example, when the diameter is less than or equal to 25%, 20%, or 15% of the effective diameter, the image may have relatively good quality. The coherence length of the random function applied for calculation of the phase function for image reconstruction may be set according to the above standards.

Figure 14:
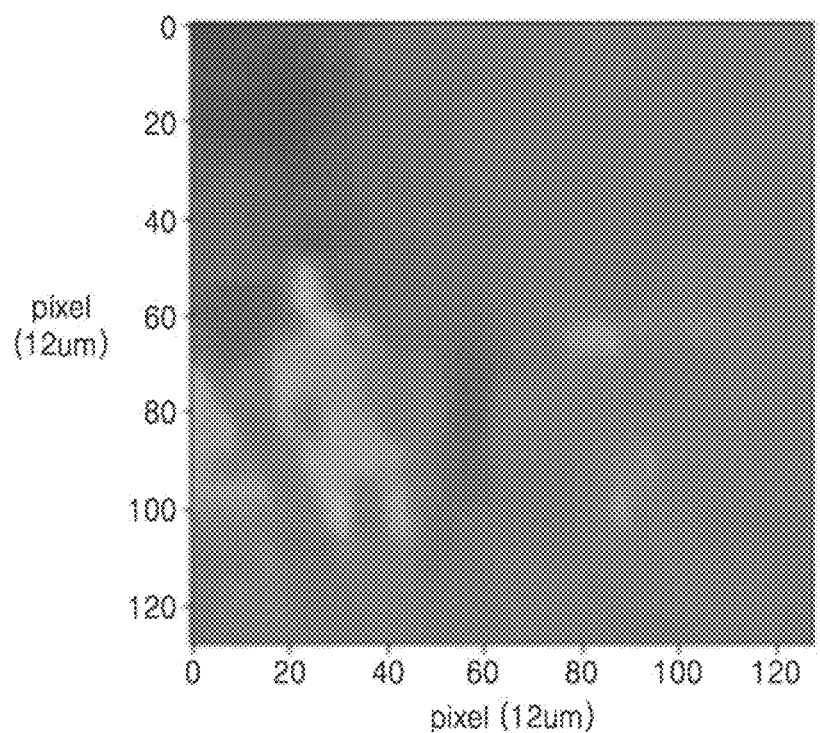
FIG. 14 shows an example image obtained by a lensless imaging system according to a related example.

FIG. 14 shows an example image obtained by a lensless imaging system according to a related example. The lensless imaging system according to a related example used in obtaining an image in FIG. 14 is an imaging system using a phase mask coded only with a random phase, that is, an imaging system using a phase mask showing PSF as illustrated in FIG. 7A. The image of FIG. 14 has very low quality, compared to FIGS. 12A and 12B illustrating the case of using the phase mask according to an example embodiment and FIG. 13 illustrating the ground truth.

As such, compared to the phase mask coded only with a random phase function, according to an example embodiment, by using a phase mask coded with a phase function obtained by adding a random phase to a les phase, the reconstructed image may have improved quality.

Figure 15:
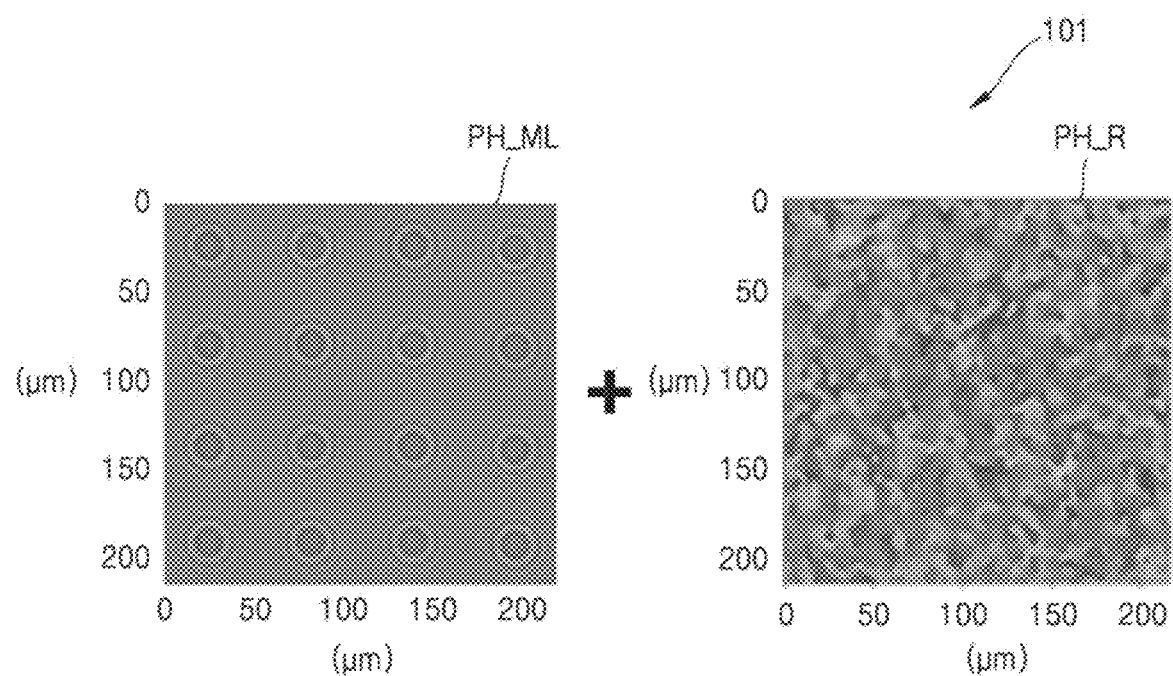
FIG. 15 is a diagram conceptually illustrating a method by which phase distribution coded to a phase mask is determined, according to an example embodiment.

FIG. 15 is a diagram conceptually illustrating a method by which a phase function for image reconstruction coded to a phase mask is determined according to an example embodiment.

The phase function for image reconstruction coded to a phase mask 101 may be calculated by adding the first phase function corresponding to a phase of a micro lens array PH_ML to the second phase function, which is a random phase PH_R. As the random phase PH_R, a function having spatially correlated randomness having a coherence length as a parameter may be used as described above, and in addition to the example range of about 5 μm to about 20 μm, various coherence lengths may be applied.

Figure 16:
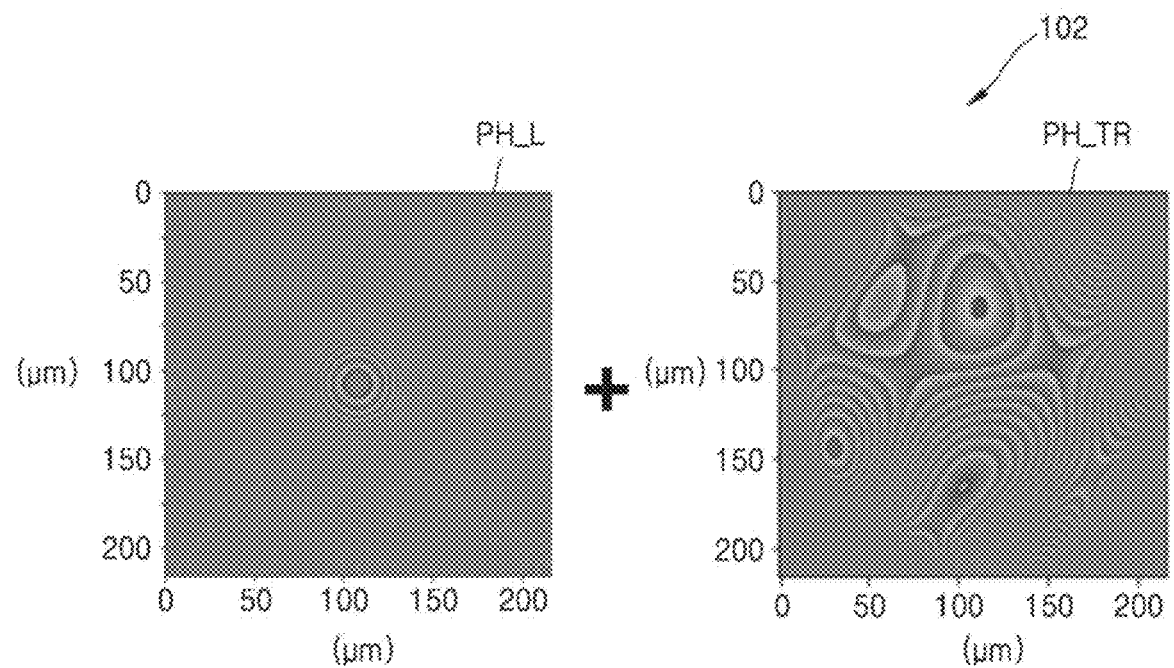
FIG. 16 is a diagram conceptually illustrating a method by which phase distribution coded to a phase mask is determined, according to another example embodiment.

FIG. 16 is a diagram conceptually illustrating a method by which a phase function for image reconstruction coded to a phase mask is determined according to another example embodiment.

The phase function for image reconstruction coded to a phase mask 102 may be calculated by adding the first phase function, which is a lens phase PH_L, to the second phase function, which is a trainable random function PH_TR.

Unlike the random function having spatially correlated randomness described in aforementioned example embodiments, the random function used in the phase mask 102 of the example embodiment may be a random function defined by using trainable coefficients. For example, Zernike polynomials may be used in such random function, and the coefficients used therein may be trained by the reconstruction algorithm.

Moreover, the phase function for image reconstruction, which is a hybrid phase function coded to the phase mask, may be set in various ways. For example, the hybrid phase function may be set by adding the first phase function corresponding to the phase of lens array to the second phase function, which is a random function defined by using trainable coefficients.

Figure 17:
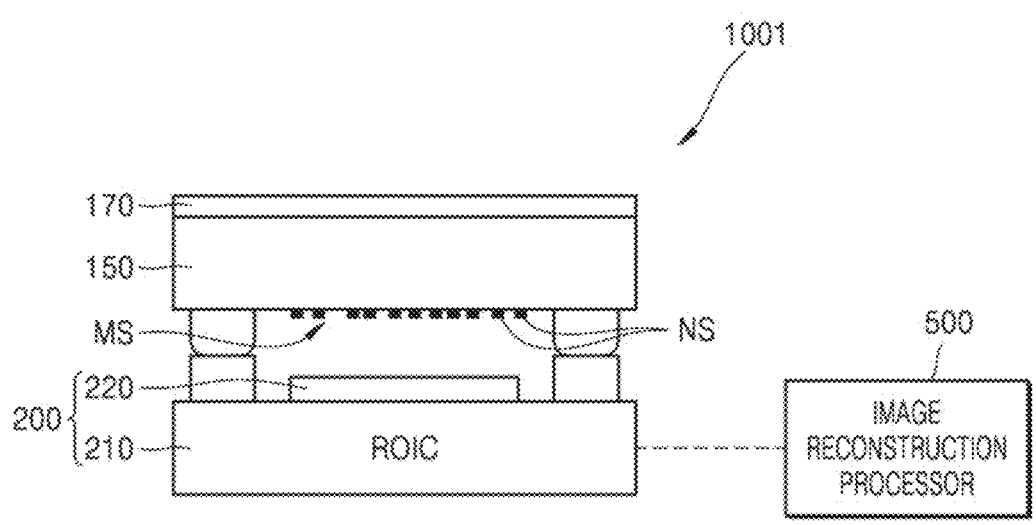
FIG. 17 is a cross-sectional view illustrating a schematic structure of an imaging system according to an example embodiment.

FIG. 17 is a cross-sectional view illustrating a schematic structure of an imaging system according to an example embodiment.

An imaging system 1001 may include the phase modulation meta surface MS, the image sensor 200, and the image reconstruction processor 500. The various examples of phase function for image reconstruction described above may be coded to the phase modulation meta surface MS. Such phase function for image reconstruction may be implemented by a plurality of nano-structures NS. The nano-structures NS may be formed on a surface of a cover layer 150 included in a packaging of the image sensor 200, i.e., a first surface facing the image sensor 200. A filter layer 170 may be further arranged on second surface of the cover layer 150 that is opposite to the first surface.

The image sensor 200 may include a circuit board 210 and a sensor array 220, and the circuit board 210 may include a circuit for driving and controlling the sensor array 220, and include, for example, a readout integrated circuit (ROIC). The ROIC may include a memory (a buffer memory, etc.) and/or an image signal processor. Although the image reconstruction processor 500 is described as a separate component in the drawings, the image reconstruction processor 500 may be implemented on the circuit board 210 or integrated with the image signal processer included in the ROIC.

The sensor array 220 may include, for example, a photoelectric conversion element (e.g., a photodiode), a complementary metal oxide semiconductor (CMOS) image sensor (CIS), or a bolometer. However, embodiments are not limited thereto.

The cover layer 150 may include a transparent material layer which does not absorb incident light, or substantially does not absorb incident light. A material of the cover layer 150 may be substantially the same as a material of the substrate SU. For example, the cover layer 150 may include a material which is transparent to light of a wavelength band to be modulated by the phase modulation meta surface MS coded with the phase function for image reconstruction.

The filter layer 170 may transmit light of a wavelength band to be modulated by the phase modulation meta surface MS and cut off light of other wavelength bands. The filter layer 170 may include, for example, a band-pass filter which transmits LWIR. An anti-reflective layer may be further formed on the filter layer 170.

The lensless imaging system may be applied to various electronic devices.

Figure 18:
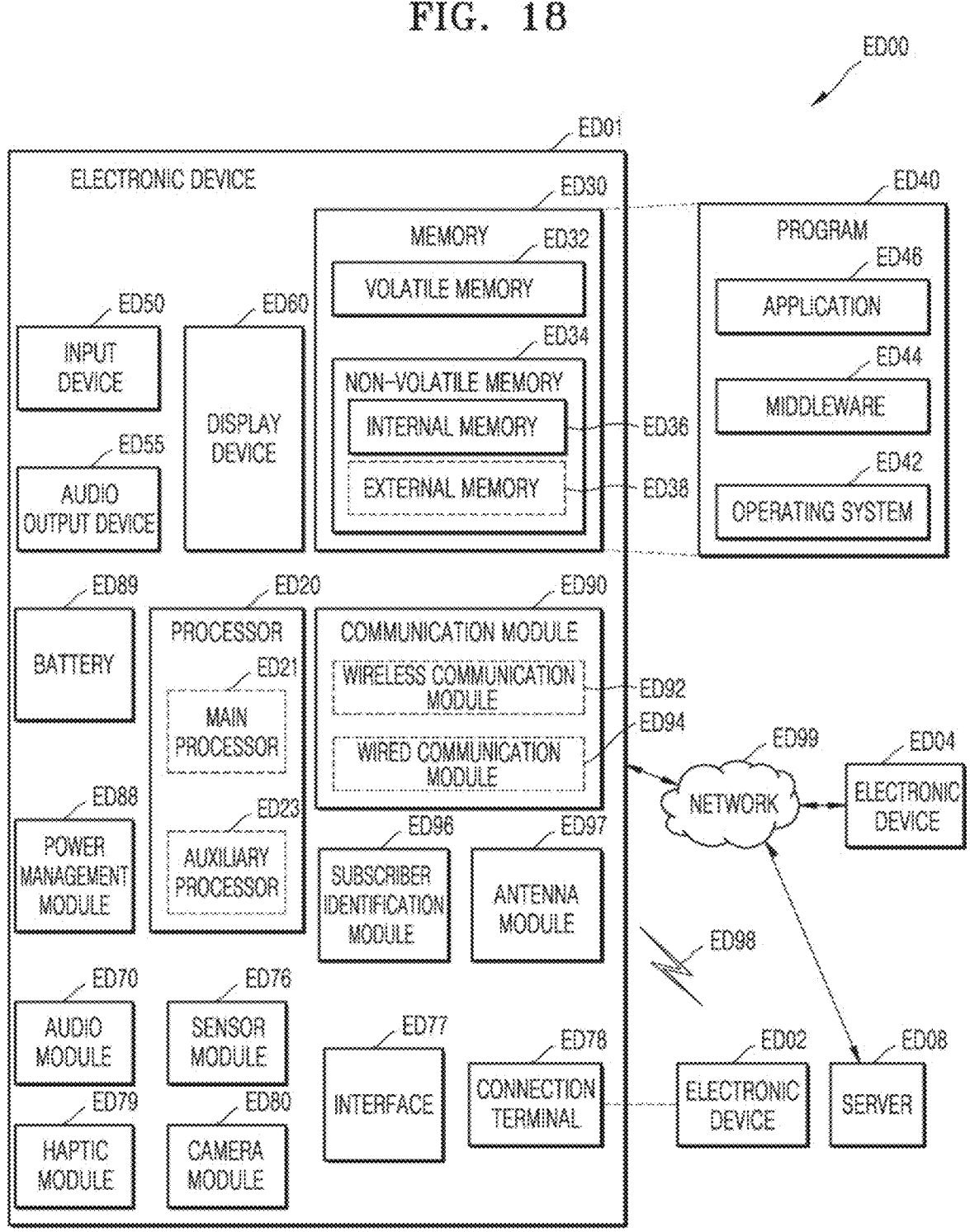
FIG. 18 is a block diagram of an electronic device according to an example embodiment.
Figure 19:
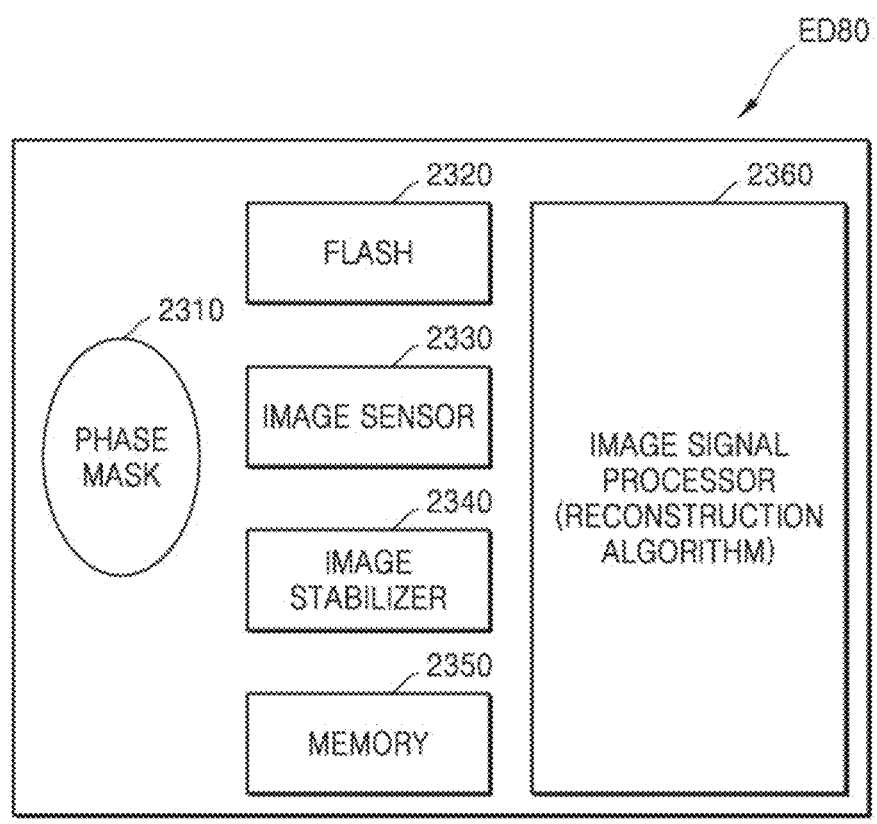
FIG. 19 is a block diagram schematically illustrating components of a camera module provided in the electronic device of FIG. 18.

FIG. 18 is a block diagram of an electronic device according to an example embodiment, and FIG. 19 is a block diagram schematically illustrating components of a cameral module provided in the electronic device of FIG. 18.

Referring to FIG. 18, in a network environment ED00, an electronic device ED01 may communicate with another electronic device ED02 through a first network ED98 (a short-range wireless communication network and the like), or communicate with another electronic device ED04 and/or a server ED08 through a second network ED99 (a long-range wireless communication network and the like). The electronic device ED01 may communicate with the electronic device ED04 through the server ED08. The electronic device ED01 may include a processor ED20, a memory ED30, an input device ED50, an audio output device ED55, a display device ED60, an audio module ED70, a sensor module ED76, an interface ED77, a haptic module ED79, a camera module ED80, a power management module ED88, a battery ED89, a communication module ED90, a subscriber identification module ED96, and/or an antenna module ED97. In the electronic device ED01, some (the display device ED60, and the like) of constituent elements may be omitted or other constituent elements may be added. Some of the constituent elements may be implemented by one integrated circuit. For example, the sensor module ED76 (a fingerprint sensor, an iris sensor, an illuminance sensor, and the like) may be implemented by being embedded in the display device ED60 (a display, and the like).

The processor ED20 may control one or a plurality of other constituent elements (hardware and software constituent elements, and the like) of the electronic device ED01 connected to the processor ED20 by executing software (a program ED40, and the like), and perform various data processing or calculations. As part of the data processing or calculations, the processor ED20 may load, in a volatile memory ED32, commands and/or data received from other constituent elements (the sensor module ED76, the communication module ED90, and the like), process the command and/or data stored in the volatile memory ED32, and store result data in a non-volatile memory ED34. The processor ED20 may include a main processor ED21 (a central processing unit, an application processor, and the like) and an auxiliary processor ED23 (a graphics processing unit, an image signal processor, a sensor hub processor, a communication processor, and the like) that is operable independently of or together with the main processor ED21. The auxiliary processor ED23 may use less power than the main processor ED21 and may perform a specialized function.

Instead of the main processor ED21 when the main processor ED21 is in an inactive state (sleep state), or with the main processor ED21 when the main processor ED21 is in an active state (application execution state), the auxiliary processor ED23 may control functions and/or states related to some constituent elements (the display device ED60, the sensor module ED76, the communication module ED90, and the like) of the constituent elements of the electronic device ED01. The auxiliary processor ED23 (an image signal processor, a communication processor, and the like) may be implemented as a part of functionally related other constituent elements (the camera module ED80, the communication module ED90, and the like).

The memory ED30 may store various data needed by the constituent elements (the processor ED20, the sensor module ED76, and the like) of the electronic device ED01. The data may include, for example, software (the program ED40, and the like) and input data and/or output data about commands related thereto. The memory ED30 may include the volatile memory ED32 and/or the non-volatile memory ED34.

The program ED40 may be stored in the memory ED30 as software, and may include an operating system ED42, middleware ED44, and/or an application ED46.

The input device ED50 may receive commands and/or data to be used for constituent elements (the processor ED20, and the like) of the electronic device ED01, from the outside (a user, and the like) of the electronic device ED01. The input device ED50 may include a microphone, a mouse, a keyboard, and/or a digital pen (a stylus pen, and the like).

The audio output device ED55 may output an audio signal to the outside of the electronic device ED01. The audio output device ED55 may include a speaker and/or a receiver. The speaker may be used for general purposes such as multimedia playback or recording playback, and the receiver can be used to receive incoming calls. The receiver may be implemented by being coupled as a part of the speaker or by an independent separate device.

The display device ED60 may visually provide information to the outside of the electronic device ED01. The display device ED60 may include a display, a hologram device, or a projector, and a control circuit to control a corresponding device. The display device ED60 may include a touch circuitry set to detect a touch and/or a sensor circuit (a pressure sensor, and the like) set to measure the strength of a force generated by the touch.

The audio module ED70 may convert sound into electrical signals or reversely electrical signals into sound. The audio module ED70 may obtain sound through the input device ED50, or output sound through a speaker and/or a headphone of another electronic device (the electronic device ED02, and the like) connected to the audio output device ED55 and/or the electronic device ED01 in a wired or wireless manner.

The sensor module ED76 may detect an operation state (power, temperature, and the like) of the electronic device ED01, or an external environment state (a user state, and the like), and generate an electrical signal and/or a data value corresponding to a detected state. The sensor module ED76 may include a gesture sensor, a gyro sensor, a barometric pressure sensor, a magnetic sensor, an acceleration sensor, a grip sensor, a proximity sensor, a color sensor, an IR sensor, a biometric sensor, a temperature sensor, a humidity sensor, and/or an illuminance sensor.

The interface ED77 may support one or a plurality of specified protocols used for the electronic device ED01 to be connected to another electronic device (the electronic device ED02, and the like) in a wired or wireless manner. The interface ED77 may include a high definition multimedia interface (HDMI), a universal serial bus (USB) interface, an SD card interface, and/or an audio interface.

A connection terminal ED78 may include a connector for the electronic device ED01 to be physically connected to another electronic device (the electronic device ED02, and the like). The connection terminal ED78 may include an HDMI connector, a USB connector, an SD card connector, and/or an audio connector (a headphone connector, and the like).

The haptic module ED79 may convert electrical signals into mechanical stimuli (vibrations, movements, and the like) or electrical stimuli that are perceivable by a user through tactile or motor sensations. The haptic module ED79 may include a motor, a piezoelectric device, and/or an electrical stimulation device.

The camera module ED80 may capture a still image and a video. The camera module ED80 may include the lensless imaging system. The camera module ED80 may include the various phase masks coded with a phase function for image reconstruction. There may be a plurality of camera modules ED80, and for example, any one of the plurality of camera modules ED80 may include the lensless imaging system, and another one of the plurality of camera modules ED80 may include a general imaging system including a lens assembly.

The power management module ED88 may manage power supplied to the electronic device ED01. The power management module ED88 may be implemented as a part of a power management integrated circuit (PMIC).

The battery ED89 may supply power to the constituent elements of the electronic device ED01. The battery ED89 may include non-rechargeable primary cells, rechargeable secondary cells, and/or fuel cells.

The communication module ED90 may establish a wired communication channel and/or a wireless communication channel between the electronic device ED01 and another electronic device (the electronic device ED02, the electronic device ED04, the server ED08, and the like), and support a communication through an established communication channel. The communication module ED90 may be operated independent of the processor ED20 (the application processor, and the like), and may include one or a plurality of communication processors supporting a wired communication and/or a wireless communication. The communication module ED90 may include a wireless communication module ED92 (a cellular communication module, a short-range wireless communication module, a global navigation satellite system (GNSS) communication module, and the like), and/or a wired communication module ED94 (a local area network (LAN) communication module, a power line communication module, and the like). Among the above communication modules, a corresponding communication module may communicate with another electronic device through the first network ED98 (a short-range communication network such as Bluetooth, WiFi Direct, or infrared data association (IrDA)) or the second network ED99 (a long-range communication network such as a cellular network, the Internet, or a computer network (LAN, WAN, and the like)). These various types of communication modules may be integrated into one constituent element (a single chip, and the like), or may be implemented as a plurality of separate constituent elements (multiple chips). The wireless communication module ED92 may verify and authenticate the electronic device ED01 in a communication network such as the first network ED98 and/or the second network ED99 by using subscriber information (an international mobile subscriber identifier (IMSI), and the like) stored in the subscriber identification module ED96.

The antenna module ED97 may transmit signals and/or power to the outside (another electronic device, and the like) or receive signals and/or power from the outside. An antenna may include an emitter formed in a conductive pattern on a substrate (a printed circuit board (PCB), and the like). The antenna module ED97 may include one or a plurality of antennas. When the antenna module ED97 includes a plurality of antennas, the communication module ED90 may select, from among the antennas, an appropriate antenna for a communication method used in a communication network such as the first network ED98 and/or the second network ED99. Signals and/or power may be transmitted or received between the communication module ED90 and another electronic device through the selected antenna. Other parts (an RFIC, and the like) than the antenna may be included as a part of the antenna module ED97.

Some of the constituent elements may be connected to each other through a communication method between peripheral devices (a bus, general purpose input and output (GPIO), a serial peripheral interface (SPI), a mobile industry processor interface (MIPI), and the like) and may mutually exchange signals (commands, data, and the like).

The command or data may be transmitted or received between the electronic device ED01 and the external electronic device ED04 through the server ED08 connected to the second network ED99. The electronic devices ED02 and ED04 may be of a type that is the same as or different from the electronic device ED01. All or a part of operations executed in the electronic device ED01 may be executed in one or a plurality of the electronic devices (ED02, ED04, and ED08). For example, when the electronic device ED01 needs to perform a function or service, the electronic device ED01 may request one or a plurality of electronic devices to perform part of the whole of the function or service, instead of performing the function or service. The one or a plurality of the electronic devices receiving the request may perform additional function or service related to the request, and transmit a result of the performance to the electronic device ED01. To this end, cloud computing, distributed computing, and/or client-server computing technology may be used.

FIG. 19 is a block diagram of the camera module ED80 provided in the electronic device ED01 and illustrates an example where the camera module ED80 is implemented as a lensless imaging system. With reference to FIG. 19, the camera module ED80 may include a phase mask 2310, a flash 2320, an image sensor 2330, an image stabilizer 2340, a memory 2350 (e.g., a buffer memory, etc.), and/or an image signal processor 2360.

The flash 2320 may emit light which is used to intensify light emitted or reflected from an object. The flash 2320 may emit visible light or infrared light. The flash 2320 may include one or a plurality of light-emitting diodes (a red-green-blue (RGB) LED, a white LED, an infrared LED, an ultraviolet LED, and the like), and/or a xenon lamp.

The image sensor 2330 may obtain an image corresponding to an object by converting light, which has been emitted or reflected from the object and then transmitted via the phase mask 2310, into electric signals.

The image stabilizer 2340 may move, in response to a movement of the camera module ED80 or an electronic device ED01 including the same, the phase mask 2310 or the image sensor 2330 in a particular direction or may compensate a negative effect due to the movement by controlling (adjusting a read-out timing, and the like) the movement characteristics of the image sensor 2330. The image stabilizer 2340 may detect a movement of the camera module ED80 or the electronic device ED01 by using a gyro sensor (not shown) or an acceleration sensor (not shown) arranged inside or outside the camera module ED80. The image stabilizer 2340 may be implemented in an optical form.

The memory 2350 may store the entire or parts of data regarding an image obtained through the image sensor 2330 for next image processing operation. For example, when a plurality of images are obtained at a high speed, the obtained original data (e.g., Bayer-patterned data, high resolution data, etc.) may be stored in the memory 2350, and only low resolution images may be displayed. Then, the memory may be used for transmission of the original data of selected images (e.g., images selected by a user, etc.) to the image signal processor 2360. The memory 2350 may be incorporated into the memory ED30 of the electronic device ED01, or configured to be an independently operated separate memory.

The image signal processor 2360 may perform image processing on the image obtained through the image sensor 2330 or the image data stored in the memory 2350. The image processing may include depth map generation, three-dimensional modeling, panorama generation, feature point extraction, image synthesis, and/or image compensation (noise reduction, resolution adjustment, brightness adjustment, blurring, sharpening, softening, and the like). The image signal processor 2360 may perform control (exposure time control, or read-out timing control, and the like) on constituent elements (the image sensor 2330 and the like) included in the camera module ED80. The image processed by the image signal processor 2360 may be stored again in the memory 2350 for additional processing or provided to external constituent elements (e.g., the memory ED30, the display apparatus ED60, the electronic device ED02, the electronic device ED04, the server ED08, etc.) of the camera module ED80. The image signal processor 2360 may be incorporated into the processor ED20, or configured to be a separate processor operated independently of the processor ED20. When the image signal processor 2360 is configured to be a separate processor from the processor ED20, the image processed by the image signal processor 2360 may undergo additional image processing by the processor ED20 and then displayed through the display apparatus ED60.

The electronic device ED01 may further include one or more additional camera modules having different properties or functions from each other. Such camera modules may include similar components as in the camera module ED80.

Alternatively, unlike the camera module ED80 of FIG. 19, the camera module may include a lens assembly instead of the phase mask 2310. An image sensor provided therein may be implemented by a charged coupled device (CCD) sensor and/or a complementary metal oxide semiconductor (CMOS) sensor, and may include one or more sensor selected from image sensors having different properties, such as an RGB sensor, a black and white (BW) sensor, an infrared (IR) sensor, and an ultraviolet (UV) sensor. One of the camera modules ED80 may be a wide angle camera, and another may be a telescopic camera. Similarly, one of the camera modules ED80 may be a front side camera, and another may be a read side camera. One of the camera modules ED80 may be a visible light camera, and another may be an infrared camera.

The lensless imaging system (1000 and 1001) according to example embodiments may be applied to various electronic devices. The lensless imaging system (1000 and 1001) according to example embodiments may be applied to a mobile phone, a smartphone, a tablet, a smart tablet, a digital camera, a camcorder, a laptop computer, a television, a smart television, etc. For example, a smartphone, a smart tablet, a flexible electronic device, etc. may include a camera mounted with the lensless imaging system (1000 and 1001) which includes a phase mask and thus has less constraints by a form factor.

Moreover, the lensless imaging system (1000 and 1001) may be applied to a smart refrigerator, a security camera, a robot, a medical camera, etc. For example, the smart refrigerator may automatically recognize food in a refrigerator, by using an image sensor, and notify a user of the presence of a particular food, the type of food that is input or output, and the like, through a smartphone. The security camera may recognize an object or a person in an image in a dark environment. The robot be provided in a disaster or industrial site that is not directly accessible by people, and may provide a high resolution image. The medical camera may provide a high resolution image for diagnosis or surgery, and thus, a field of vision may be dynamically adjusted.

The lensless imaging system (1000 and 1001) may also be applied to a vehicle. The vehicle may include a plurality of cameras for vehicle arranged in various positions, and each camera for vehicle may include an image sensor according to an example embodiment. The vehicle may provide various information about the inside or periphery of the vehicle to a driver by using the plurality of cameras for vehicle, and may automatically recognize an object or a person in an image to provide information required for autonomous driving.

The imaging system described above may be used as a lensless imaging system including a phase mask coded with a phase function for image reconstruction.

The phase function for image reconstruction coded to the phase mask may be a function obtained by adding a random phase to a lens phase, and accordingly, the quality of images reproduced by the reconstruction algorithm may be improved.

An imaging system employing the phase mask may have a reduced size, which leads to minimized spatial constraints, and may provide light efficiency and image quality similar to those of an imaging system with a lens.

An imaging system including the phase mask may be employed in various electronic devices, and may implement a camera having less constraints by a form factor in a small electronic device, a flexible electronic device, a robot, a vehicle, etc.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims and their equivalents.

What is claimed is:

1. An imaging system comprising:
    a phase mask comprising a phase modulation meta surface coded with an image reconstruction phase function configured to reconstruct an image, the image reconstruction phase function being obtained by adding a first phase function corresponding to a lens phase to a second phase function which is a random function; and
    an image sensor configured to convert light, transmitted through the phase mask from an object, into an electrical signal,
    wherein the second phase function is a function having spatially correlated randomness having a coherence length as a parameter.

2. The imaging system of claim 1, further comprising an image reconstruction processor configured to execute a reconstruction algorithm corresponding to the image reconstruction phase function and process a signal from the image sensor.

3. The imaging system of claim 1, wherein an imaging lens is not provided between the object and the image sensor.

4. The imaging system of claim 1, wherein a point spread function by the phase modulation meta surface includes a speckle pattern formed within a certain range from a center portion of the phase modulation meta surface.

5. The imaging system of claim 4, wherein the coherence length of the second phase function is set such that a diameter of the certain range is less than or equal to 30% of a lens effective diameter represented by the first phase function.

6. The imaging system of claim 1, wherein the second phase function is a phase function corresponding to trainable coefficients.

7. The imaging system of claim 1, wherein the first phase function is a phase function corresponding to a convex lens.

8. The imaging system of claim 1, wherein the first phase function is a phase function corresponding to a micro lens array.

9. The imaging system of claim 1, wherein a distance between the phase mask and the image sensor is less than a focal length of a lens having the first phase function.

10. The imaging system of claim 1, wherein a distance between the phase mask and the image sensor is less than or equal to a half of a focal length of a lens having the first phase function.

11. The imaging system of claim 1, wherein the phase modulation meta surface comprises a plurality of nano-structures, and
    wherein a shape of the plurality of nano-structures and a size of the plurality of nano-structures are determined based on the image reconstruction phase function.

12. The imaging system of claim 11, wherein the phase mask further comprises a substrate,
    wherein the plurality of nano-structures are on the substrate.

13. The imaging system of claim 12, wherein the substrate includes a material transparent to long-wave infrared (LWIR).

14. The imaging system of claim 11, further comprising a cover layer comprising:
- a first surface facing the image sensor; and
- a second surface opposite to the first surface,
- wherein the plurality of nano-structures are on the first surface.

15. The imaging system of claim 14, further comprising a filter layer on the second surface.

16. The imaging system of claim 15, wherein the filter layer is configured to transmit long-wave infrared (LWIR) and block light of other wavelength bands.

17. The imaging system of claim 15, wherein the filter layer is configured to transmit light of a certain wavelength band, and
- wherein the cover layer includes a material transparent to the light of the certain wavelength band.

18. An electronic device comprising:
an imaging system comprising:
- a phase mask comprising a phase modulation meta surface coded with an image reconstruction phase function configured to reconstruct an image, the image reconstruction phase function being obtained by adding a first phase function corresponding to a lens phase to a second phase function which is a random function; and
- an image sensor configured to convert light, transmitted through the phase mask from an object, into an electrical signal,
- wherein the second phase function is a function having spatially correlated randomness having a coherence length as a parameter.

19. The electronic device of claim 18, wherein the phase modulation meta surface comprises a plurality of nano-structures, and
- wherein a shape of the plurality of nano-structures and a size of the plurality of nano-structures are determined based on the image reconstruction phase function.

* * * * *